(12) United States Patent
Nashiki et al.

(10) Patent No.: US 9,207,482 B2
(45) Date of Patent: Dec. 8, 2015

(54) CAPACITIVE TOUCH SENSOR LAMINATE FOR DISPLAY PANEL DEVICE

(75) Inventors: Tomotake Nashiki, Ibaraki (JP);
Kazuhiro Nakajima, Ibaraki (JP);
Hideo Sugawara, Ibaraki (JP); Tsuyoshi Chiba, Ibaraki (JP); Hiroaki Kishioka, Toyohashi (JP); Mayumi Kishioka, legal representative, Toyohashi (JP);
Tomohide Banba, Ibaraki (JP);
Masahiro Ooura, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 83 days.

(21) Appl. No.: 13/990,658

(22) PCT Filed: Nov. 30, 2011

(86) PCT No.: PCT/JP2011/077615
§ 371 (c)(1),
(2), (4) Date: May 30, 2013

(87) PCT Pub. No.: WO2012/073990
PCT Pub. Date: Jun. 7, 2012

(65) Prior Publication Data
US 2013/0258570 A1    Oct. 3, 2013

(30) Foreign Application Priority Data

Nov. 30, 2010 (JP) ................................ 2010-267379

(51) Int. Cl.
*G02F 1/1333* (2006.01)
*G06F 3/044* (2006.01)
(Continued)

(52) U.S. Cl.
CPC .............. *G02F 1/13338* (2013.01); *G06F 3/03* (2013.01); *G06F 3/044* (2013.01); *G06F 3/045* (2013.01);
(Continued)

(58) Field of Classification Search
CPC ........................ G06F 3/044; Y10T 428/24802
USPC ........................................................ 428/195.1
See application file for complete search history.

(56) References Cited

U.S. PATENT DOCUMENTS

2005/0170158 A1    8/2005    Hattori et al.
2008/0129317 A1    6/2008    Oba
(Continued)

FOREIGN PATENT DOCUMENTS

CN    101057210 A    10/2007
CN    101196654 A    6/2008
(Continued)

OTHER PUBLICATIONS

Machine translation of JP2001-343529 acquired on Jan. 25, 2015.*
(Continued)

*Primary Examiner* — Gerard Higgins
(74) *Attorney, Agent, or Firm* — Hauptman Ham, LLP

(57) ABSTRACT

A capacitive touch sensor laminate for use in a display panel device includes: a dielectric central substrate structure made of a transparent resin material and formed to have flat surfaces, respectively, on opposite sides thereof; a at least one-layer structured coat layer made of a transparent material, formed on each of the flat surfaces, and including at least one refractive index adjusting layer for suppressing visibility of an electrode pattern formed by the transparent electrically conductive layer; and a transparent electrically conductive layer formed on and in adjacent relation to the coat layer. The at least one-layer structured coat layers formed on respective ones of the flat surfaces are configured such that thicknesses of corresponding layers therein on respective opposite sides of the dielectric central substrate structure are set to allow the corresponding layers to become mutually symmetrical across the dielectric central substrate structure.

10 Claims, 14 Drawing Sheets

First transparent electrically conductive layer 31
Second refractive index adjusting undercoat layer 33b
First refractive index adjusting undercoat layer 33a } 33
Substrate layer-side hard coat layer 34
Transparent substrate layer 35
Substrate layer-side hard coat layer 37
First refractive index adjusting undercoat layer 36a
Second refractive index adjusting undercoat layer 36b } 36
Second transparent electrically conductive layer 32

(51) Int. Cl.
  *G06F 3/045* (2006.01)
  *G06F 3/03* (2006.01)

(52) U.S. Cl.
  CPC .... *Y10T 428/2495* (2015.01); *Y10T 428/24802* (2015.01); *Y10T 428/24942* (2015.01); *Y10T 428/24967* (2015.01)

(56) References Cited

U.S. PATENT DOCUMENTS

| | | |
|---|---|---|
| 2008/0138589 A1 | 6/2008 | Wakabayashi et al. |
| 2008/0152879 A1 | 6/2008 | Nashiki et al. |
| 2008/0176042 A1 | 7/2008 | Nashiki et al. |
| 2009/0160819 A1 | 6/2009 | Sasaki et al. |
| 2010/0015417 A1 | 1/2010 | Nakajima |
| 2011/0135892 A1 | 6/2011 | Nashiki et al. |
| 2011/0141059 A1 | 6/2011 | Nashiki et al. |
| 2011/0143105 A1 | 6/2011 | Nashiki et al. |
| 2011/0147340 A1 | 6/2011 | Nashiki et al. |

FOREIGN PATENT DOCUMENTS

| | | | |
|---|---|---|---|
| CN | 101226450 A | | 7/2008 |
| EP | 1870799 A | | 12/2007 |
| EP | 1947551 A | | 7/2008 |
| EP | 1947551 A2 | | 7/2008 |
| JP | 03009323 | | 1/1991 |
| JP | 3542838 | | 6/1996 |
| JP | 3569557 | | 6/1996 |
| JP | 2001343529 A | * | 12/2001 |
| JP | 2002040243 | | 2/2002 |
| JP | 2002055780 | | 2/2002 |
| JP | 2002156920 | | 5/2002 |
| JP | 2008140130 | | 6/2008 |
| JP | 2008146927 A | | 6/2008 |
| JP | 2009076432 | | 4/2009 |
| JP | 2010027294 | | 2/2010 |
| JP | 2010177194 A | | 8/2010 |
| JP | 2010198103 | | 9/2010 |
| JP | 2010208169 | | 9/2010 |
| KR | 1020070054661 A | | 5/2007 |
| KR | 10-2008-0052402 A | | 6/2008 |
| WO | 2006028131 A1 | | 3/2006 |
| WO | 2006126604 | | 11/2006 |

OTHER PUBLICATIONS

Korean Office Action for application No. 10-2013-7014876 dated Jun. 27, 2014.
International Search Report mailed Dec. 27, 2011 for PCT/JP2011/077615.
Chinese Office Action for application No. 201180057677.3 dated Jun. 27, 2015.
European Search Report for application No. 11845861.1 dated Feb. 10, 2015.
Notification of Reasons for Refusal issued by KIPO(Korean Intellectual Property Office) for application No. KR10-2014-7032938 dated Mar. 9, 2015.
Japanese Office Action for application No. 2012-546905 dated Oct. 19, 2015.

* cited by examiner

FIG.1

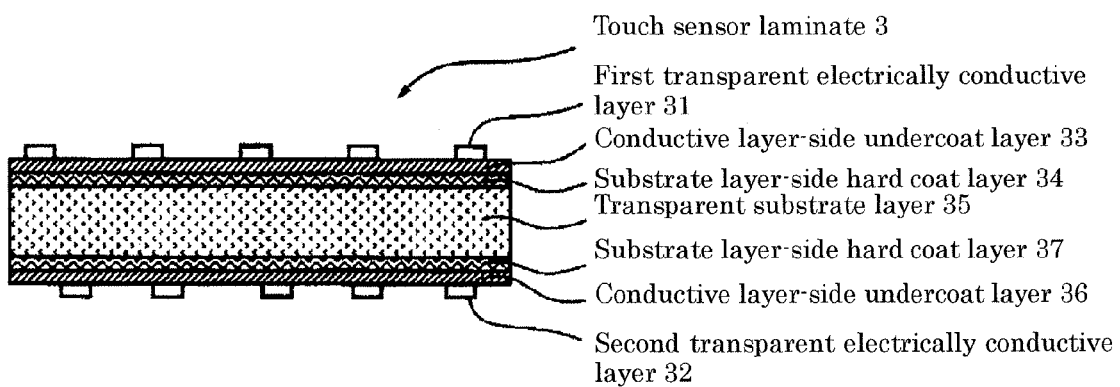

Touch sensor laminate 3
First transparent electrically conductive layer 31
Conductive layer-side undercoat layer 33
Substrate layer-side hard coat layer 34
Transparent substrate layer 35
Substrate layer-side hard coat layer 37
Conductive layer-side undercoat layer 36
Second transparent electrically conductive layer 32

FIG.2

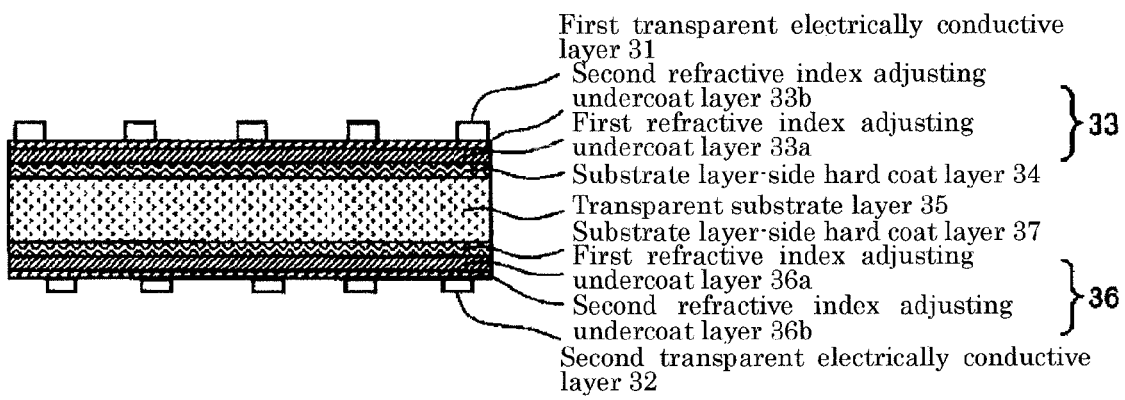

First transparent electrically conductive layer 31
Second refractive index adjusting undercoat layer 33b
First refractive index adjusting undercoat layer 33a
} 33
Substrate layer-side hard coat layer 34
Transparent substrate layer 35
Substrate layer-side hard coat layer 37
First refractive index adjusting undercoat layer 36a
Second refractive index adjusting undercoat layer 36b
} 36
Second transparent electrically conductive layer 32

FIG.12
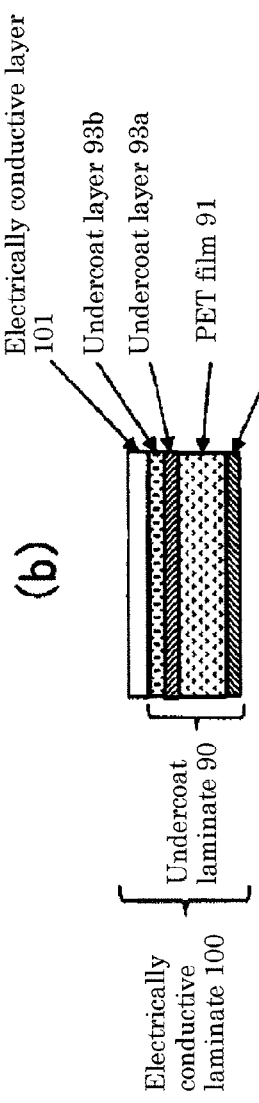
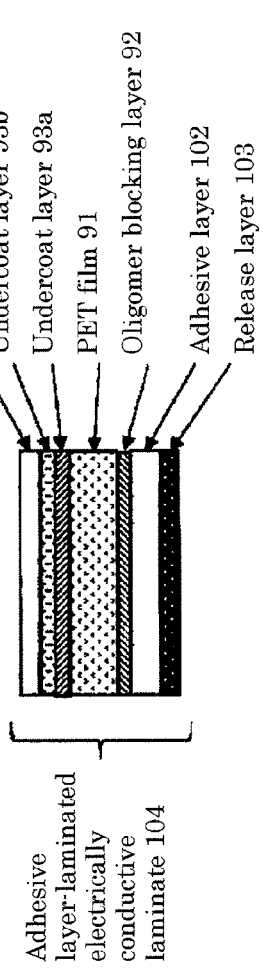
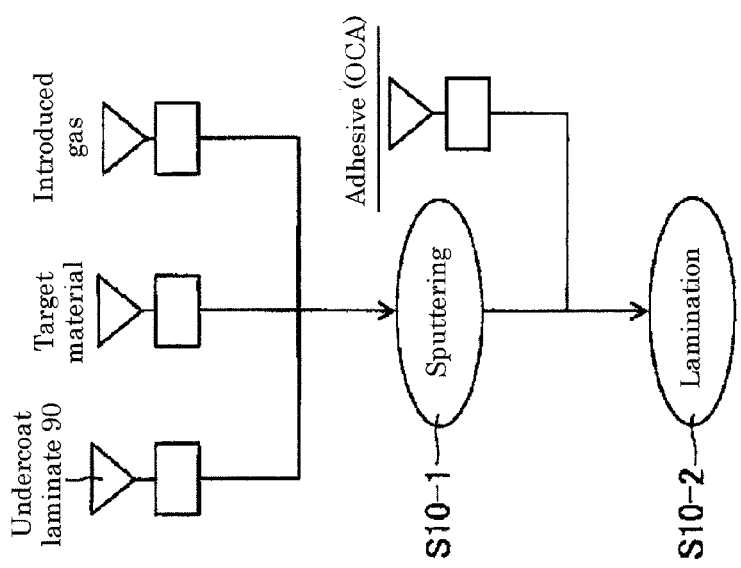

CAPACITIVE TOUCH SENSOR LAMINATE FOR DISPLAY PANEL DEVICE

CROSS REFERENCE TO RELATED APPLICATION

This application claims the priority of Japanese Patent Application No. 2010-267379, filed on Nov. 30, 2010 in the JIPO (Japanese Intellectual Property Office). Further, this application is the National Phase application of International Application No. PCT/JP2011/077615 filed Nov. 30, 2011, which designates the United States and was published in Japanese.

TECHNICAL FIELD

The present invention relates to a touch sensor laminate for use in a display panel device having a touch input function. In particular, the present invention relates to a capacitive touch sensor laminate for a display.

BACKGROUND ART

A display panel device equipped with a touch panel for touch input is disclosed in a large number of documents. For example, JP 2002-040243A (Patent Document 1), JP 2002-055780A (Patent Document 2) and JP 2002-156920A (Patent Document 3) disclose a display panel device in which a touch panel for touch input is disposed on an upper side of a display panel board. All of the touch panels described in the Patent Documents 1 to 3 are a resistive type in which two transparent electrodes are disposed in a spaced-apart and opposed relation, wherein one of the transparent electrodes disposed on a viewing side of the display panel device is adapted to be pressed and brought into contact with the other transparent electrode, thereby allowing a tough input to be sensed. In the Patent Documents 1 to 3, there is an air gap between the two electrodes, which leads to a problem that reflected light in surfaces of the electrodes is transmitted to the viewing side of the display panel device, causing deterioration in display quality. In order to cope with this problem of internal reflection, the Patent Documents 1 to 3 teach arranging a circular polarization element on the viewing side with respect to the touch panel. Specifically, the Patent Documents 1 to 3 propose to arrange a linear polarization layer and a ¼ λ retardation (phase difference) layer in this order from the viewing side of the display panel, and arrange the touch panel on a lower side of the ¼ λ retardation layer. The Patent Document 1 discloses a configuration in which a touch panel is combined with a reflective liquid crystal display, and the Patent Document 2 mentions applicability to both a liquid crystal display and an organic EL display. Further, the Patent Document 3 offers an example of an organic EL display.

JP 2010-198103A (Patent Document 4) discloses a capacitive touch input device. A touch sensor described in the Patent Document 4 comprises an electrode section provided on each of opposite sides of a substrate film formed as an integral film and composed of a patterned electrically conductive layer. The Patent Document 4 mentions that the integral film includes a configuration which comprises a functional film inseparably formed on one or each of opposite surfaces of a film body, for example, by sputtering. In the Patent Document 4, an index matching (refractive index adjusting) film is described as an example of the functional film, and FIG. 4(a) illustrates a film structure in which a plurality of high refractive index films and a plurality of low refractive index films are alternately arranged on a surface of a film body in a thickness direction of the film body. The Patent Document 4 further discloses, in FIG. 4(c) thereof, a film structure in which a single layer of low refractive index film is formed on a surface of a substrate film. The index matching film and the low refractive index film described in the Patent Document 4 is explained that they have a function of preventing a reflectance from largely changing between a region with the electrode section and a region devoid of the electrode section. The touch panel sensor comprising the integral film and the electrode section on each of the opposite sides of the integral film is used in such a manner that a protective cover functioning as an input screen is bonded to one surface of the touch panel sensor through an adhesive layer, and a display formed as a flat panel display is bonded to the other surface through an adhesive layer.

A touch sensor having a configuration in which an electrode is formed on each of opposite sides of a dielectric film layer is also described in FIG. 5 of JP 2009-076432A (Patent Document 5). The Patent Document 5 further describes, in FIG. 7 thereof, a double-electrode type touch sensor prepared by: forming a transparent electrode layer on one surface of a film substrate through an undercoat layer; bonding the other surface of the film substrate to a second film substrate through an adhesive layer; and forming a second transparent electrode layer on the second film substrate through a second undercoat layer. The Patent Document 5 mentions that a difference between respective refractive indexes of the undercoat layer and the transparent electrode layer is preferably set to 0.1 or more. Although the Patent Document 5 mentions that the undercoat layer may be formed in a multi-layer structure, a relationship therebetween in terms of thickness is not particularly described. Moreover, in the case where the undercoat layer is formed in a two-layer structure, a relationship between the undercoat layers in terms of refractive index is not particularly described. JP 2008-140130A (Patent Document 6) describes a touch sensor in which an electrode section composed of a patterned electrically conductive film is formed on each of opposite surfaces of a transparent substrate made, for example, of PET, wherein a protective layer is formed on an outer side of one of the two electrode sections, and a sensitivity adjusting layer is formed on an outer side of the other electrode section. In this structure, the sensitivity adjusting layer is designed such that by a thickness thereof is adjusted to a given value to prevent potential fluctuation at a grounding electrically conductive pattern of the touch sensor.

With regard to patterning of a transparent electrode for use in a touch sensor, one example is illustrated in FIG. 3 of the Patent Document 4, and some other examples are described in detail in WO 2006/126604A (Patent Document 7).

JP 03-009323A (Patent Document 8) teaches selecting an appropriate material under recognition of a necessity to achieve optical isotropy without the occurrence of colored interference fringes, when a resin material is used in an electrode substrate for a liquid crystal display panel. JP 3542838B (Patent Document 9) and JP 3569557B (Patent Document 10) describe using an optically isotropic resin material as a material for an electrically conductive transparent sheet for a touch panel. In the Patent Documents 8 and 9, a recommended optically isotropic resin material includes a polycarbonate-based resin, a polyethersulfone-based resin, a polysulfone-based resin, and a polyarylate-based resin.

LIST OF PRIOR ART DOCUMENTS

Patent Documents

Patent Document 1: JP 2002-040243A
Patent Document 2: JP 2002-055780A

Patent Document 3: JP 2002-156920A
Patent Document 4: JP 2010-198103A
Patent Document 5: JP 2009-076432A
Patent Document 6: JP 2008-140130A
Patent Document 7: WO 2006/126604A
Patent Document 8: JP 03-009323A
Patent Document 9: JP 3542838B
Patent Document 10: JP 3569557B

SUMMARY OF THE INVENTION

Technical Problem

Both of the Patent Documents 4 and 5 teach providing the refractive index adjusting layer between the substrate layer and the electrode section, in order to reduce a situation where the pattern of the electrode section becomes visible from a viewing side, due to a difference in refractive index between the substrate layer and the electrode section. However, each of the Patent Document 4 and the Patent Document 5 recommends a different technique. Moreover, none of these Patent Documents mentions that the above object could be sufficiently achieved by the taught technique. In the Patent Document 6, the transparent electrode is directly formed on the substrate layer, and no measure against the situation where the electrode pattern becomes visible from the viewing side is disclosed.

Further, in the laminate type of touch sensor as described in the above Patent Documents, a level of expansion and shrinkage to be caused by changes in temperature and humidity conditions varies between respective layers, which leads to a problem that warping deformation occurs in the laminate. Although not described in any of the above Patent Documents, it is often the case that a hard coat layer is provided on a surface of a substrate for use in this type of touch sensor, in order to prevent damage to the surface of the substrate. The hard coat has a thickness greater than that of the refractive index adjusting layer, and thereby exerts a large influence on the warping deformation. None of the above Patent Documents discusses the problem of warping deformation, and teaches appropriate measures.

In a touch sensor laminate for use in a display panel device having a touch input function, the present invention addresses a major technical problem of obtaining a configuration capable of maximally preventing deterioration in display quality due to internal reflection of light, and suppressing warping deformation even under changes in temperature and humidity conditions.

Solution to the Technical Problem

In order to solve the above technical problem, according to one aspect of the present invention, there is provided a capacitive touch sensor laminate for use in a display panel device having a touch input function. The capacitive touch sensor laminate comprises: a dielectric central substrate structure made of a transparent resin material and formed to have flat surfaces, respectively, on opposite sides thereof; an at least one-layer structured coat layer made of a transparent material and formed on each of the flat surfaces; and a transparent electrically conductive layer formed on and in adjacent relation to the coat layer. The at least one-layer structured coat layer comprises at least one refractive index adjusting layer for suppressing visibility of an electrode pattern formed by the transparent electrically conductive layer, and the at least one-layer structured coat layers formed on respective ones of the flat surfaces are configured such that thicknesses of corresponding layers therein on respective opposite sides of the dielectric central substrate structure are set to allow the corresponding layers to become mutually symmetrical across the dielectric central substrate structure.

Preferably, in the capacitive touch sensor laminate of the present invention, the refractive index adjusting layer comprises: a first refractive index adjusting undercoat layer disposed on a side closer to the dielectric central substrate structure; and a second refractive index adjusting undercoat layer formed on the first refractive index adjusting undercoat layer, wherein the first refractive index adjusting undercoat layer has a refractive index greater than that of the second refractive index adjusting undercoat layer.

In the capacitive touch sensor laminate of the present invention, the at least one-layer structured coat layer may be composed of: a hard coat layer disposed on a side closer to the dielectric central substrate structure; and an at least one-layer structured refractive index adjusting undercoat layer formed on the hard coat layer. In this case, it is preferable that the at least one-layer structured refractive index adjusting undercoat layer comprises: a first refractive index adjusting undercoat layer disposed on a side closer to the hard coat layer; and a second refractive index adjusting undercoat layer formed on the first refractive index adjusting undercoat layer, wherein the first refractive index adjusting undercoat layer has a refractive index greater than that of the second refractive index adjusting undercoat layer. More preferably, the first undercoat layer has a thickness of 35 nm or less, and the second undercoat layer has a thickness less than that of the first undercoat layer. In this case, it is particularly preferable that the thickness of the second undercoat layer is equal to or less than ½ of the thickness of the first undercoat layer.

Preferably, in the capacitive touch sensor laminate of the present invention, the dielectric central substrate structure is prepared by bonding first and second transparent substrate layers made of a same material and formed to have a same thickness, together through a transparent adhesive material layer. More preferably, each of the first and second transparent substrate layers is bonded to the transparent adhesive material layer through a second hard coat layer.

In the capacitive touch sensor laminate of the present invention, the dielectric central substrate structure is composed of a single transparent resin material layer. In this case, the single transparent resin material layer may be made of an optically isotropic material, or may be formed as a ¼ wavelength retardation layer.

As an adhesive for forming the transparent adhesive layer in the capacitive touch sensor laminate of the present invention, it is possible to use an acrylic-based adhesive, a silicone-based adhesive, polyester-based adhesive, a rubber-based adhesive, or a polyurethane-based adhesive, for example. The adhesives may be used independently or in the form of a combination of two or more of them. Among them, it is preferable to use an acrylic-based adhesive containing, as a primary component or a base polymer, an acrylic-based polymer comprising a primary monomer component consisting of an alkyl (meth)acrylate ester having an alkyl group with a carbon number of 1 to 18 [C 1-18 alkyl (meth)acrylate ester]. For example, the C 1-18 alkyl (meth)acrylate ester includes methyl (meth)acrylate, ethyl (meth)acrylate, propyl (meth)acrylate, isopropyl (meth)acrylate, butyl (meth)acrylate, isobutyl (meth)acrylate, sec-butyl (meth)acrylate, tert-butyl (meth)acrylate, pentyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, and dodecyl (meth)acrylate. The C 1-18 alkyl (meth)acrylate esters may be used independently or in the form of a mixture of two or more of them.

As a component of the acrylic-based polymer, a monomeric component (copolymerizable monomer) having a copolymerizability with respect to the C 1-18 alkyl (meth) acrylate ester may be used. In particular, when the acrylic-based polymer is subjected to cross-linking, it is preferable to use, as a copolymerizable monomer, an acrylic-based pressure-sensitive adhesive modifying monomer. As the modifying monomer, it is possible to use any one of various monomers known as an acrylic-based pressure-sensitive adhesive modifying monomer, for example. The copolymerizable monomers may be used independently or in the form of a combination of two or more of them. Specifically, the copolymerizable monomer includes, for example, a copolymerizable monomer having one of various functional groups (particularly, polar groups) (i.e., a functional group-containing copolymerizable monomer), a styrene-based monomer, such as styrene, and an α-olefin based monomer, such as ethylene or propylene. The functional group-containing copolymerizable monomer may include: vinylesters, such as vinyl acetate; cyano-containing copolymerizable monomer, such as (meth) acrylonitrile; amide-containing copolymerizable monomer, such as (meth)acrylamide, or N,N-dimethyl (meth)acrylamide; hydroxy-containing copolymerizable monomer, such as 2-hydroxyethyl (meth)acrylate, 3-hydroxypropyl (meth) acrylate, 4-hydroxybutyl (meth)acrylate, or 6-hydroxyhexyl (meth)acrylate; epoxy-containing copolymerizable monomer, such as glycidyl (meth)acrylate; amino-containing copolymerizable monomer, such as N,N-dimethylamine ethyl alkyl (meth)acrylate ester; and carboxy-containing copolymerizable monomer, such as (meth)acrylic acid, crotonic acid, itaconic acid, maleic acid, maleic anhydride or fumaric acid. As the modifying monomer, it is possible to use the functional group-containing copolymerizable monomers. Among them, a hydroxy-containing copolymerizable monomer and a carboxy-containing copolymerizable monomer are preferable, and an acrylic acid is particularly preferable. The acrylic-based polymer can be cross-linked by utilizing a functional group (particularly, polar group) derived from the modifying monomer. As a polymerization method for obtaining the acrylic-based polymer, it is possible to employ a solution polymerization method designed to be performed using a polymerization initiator such as azo-based compound or peroxide, an emulsion polymerization method, a bulk polymerization method, or a polymerization method designed to be performed using a photopolymerization initiator and in combination with irradiation with light or radiation.

As a cross-linking agent, a multifunctional melamine compound, a multifunctional epoxy compound and a multifunctional isocyanate compound are particularly preferable. The cross-linking agents may be used independently or in the form of a mixture of two or more of them. The multifunctional melamine compound includes methylated trimethylolmelamine, and butylated hexamethylolmelamine, for example. The multifunctional epoxy compound includes diglycidylaniline and glycerol diglycidyl ether, for example. For example, an amount of the multifunctional melamine compound and/or the multifunctional epoxy compound to be used is set in the range of 0.001 to 10 weight parts, preferably, in the range of 0.01 to 5 weight parts, with respect to 100 weight parts of the above polymer. The multifunctional isocyanate compound includes, for example, tolylene diisocyanate, hexamethylene diisocyanate, polymethylenepolyphenyl isocyanate, diphenylmethane diisocyanate, diphenylmethane diisocyanate dimer, reaction product between trimethylol propane and tolylene diisocyanate, reaction product between trimethylol propane and hexamethylene diisocyanate, polyether polyisocyanate, and polyester polyisocyanate. For example, an amount of the multifunctional isocyanate compound to be used is set in the range of 0.01 to 20 weight parts, preferably, in the range of 0.05 to 15 weight parts, with respect to 100 weight parts of the above polymer.

Preferably, the adhesive layer has high transparency. For example, it is desirable that a total light transmittance (based on JIS K 7136) in a visible light wavelength range is 85% or more (preferably, 87% or more, more preferably, 90% or more).

A haze value (based on JIS K 7136) of the pressure-sensitive adhesive sheet 1 which may be of a both sides adhesive type may be selectively set to 2.0% or less (preferably, 1.0% or less, more preferably, 0.5% or less).

Preferably, each of the first and second substrate layers is formed of a polyethylene terephthalate (PET) film or an optically isotropic material. The undercoat layer is designed to prevent internal reflection, and related information, such as usable materials and anti-reflection functions, is described in detail in the Patent Document 5. In the present invention, the materials described in the Patent Document 5 may be used for the undercoat layer.

Effect of the Invention

As mentioned above, in a touch sensor laminate for use in a display panel device having a touch input function, the present invention makes it possible to suppress warping deformation occurring in the laminate due to changes in temperature and humidity conditions. In addition, it becomes possible to substantially prevent the problem that the pattern of the transparent electrically conductive layer of the touch sensor laminate becomes visible from the viewing side due to internal reflection of light, causing deterioration in display quality. Further, the present invention makes it possible to obtain a touch sensor laminate for a display panel device, with a thin layer structure allowing convenient handling.

BRIEF DESCRIPTION OF THE DRAWINGS

FIG. 1 is a sectional view illustrating a touch sensor laminate according to one embodiment of the present invention.

FIG. 2 is a sectional view illustrating a touch sensor laminate according to another embodiment of the present invention.

FIGS. 8(a) and 8(b) illustrate a coating and laminating station for the process illustrated in FIG. 7, wherein FIG. 8(a) is a schematic diagram of the entire station, and FIG. 8(b) is a schematic sectional view of an adhesive laminate after lamination.

FIGS. 9(a) and 9(b) illustrate a station for producing a polarizer laminate, wherein FIG. 9(a) is a schematic diagram of the entire station, and FIG. 9(b) is a schematic sectional view of a polarizer laminate to be obtained.

FIGS. 10(a) and 10(b) illustrate a process of producing a polarization functional laminate, wherein FIG. 10(a) is a block diagram of the entire process, and FIG. 10(b) is a schematic sectional view of a laminate to be obtained.

FIGS. 11(a) and 11(b) illustrate a process of forming an undercoat layer on a substrate as an element layer of a touch sensor laminate, wherein FIG. 11(a) is a schematic block diagram of the process, and FIG. 11(b) is a schematic sectional view of a substrate coated with an undercoat layer.

FIGS. 12(a) to 12(c) illustrate a process of forming an electrically conductive layer on the undercoat layer-coated substrate, wherein FIGS. 12(a), 12(b) and 12(c) are, respectively, a schematic block diagram of the process, a sectional view of an electrically conductive laminate to be obtained, and a sectional view of an adhesive layer-laminated electrically conductive laminate to be obtained by laminating the adhesive layer to the electrically conductive laminate.

DESCRIPTION OF EMBODIMENTS

Figure 3:
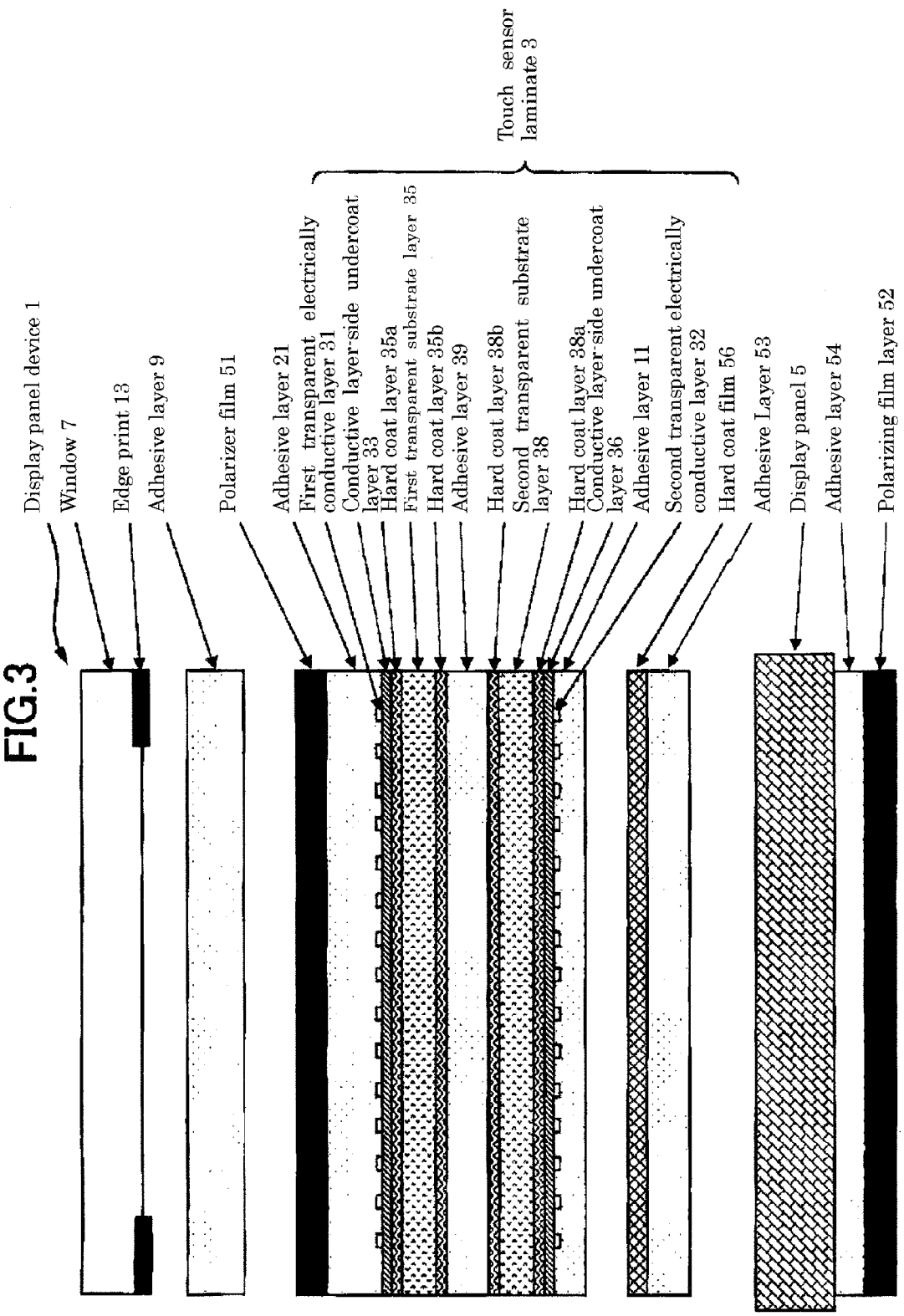
FIG. 3 is a sectional view illustrating one example in which a touch sensor laminate according to the present invention is employed in a display using a liquid crystal display panel as a display panel.
Figure 4:
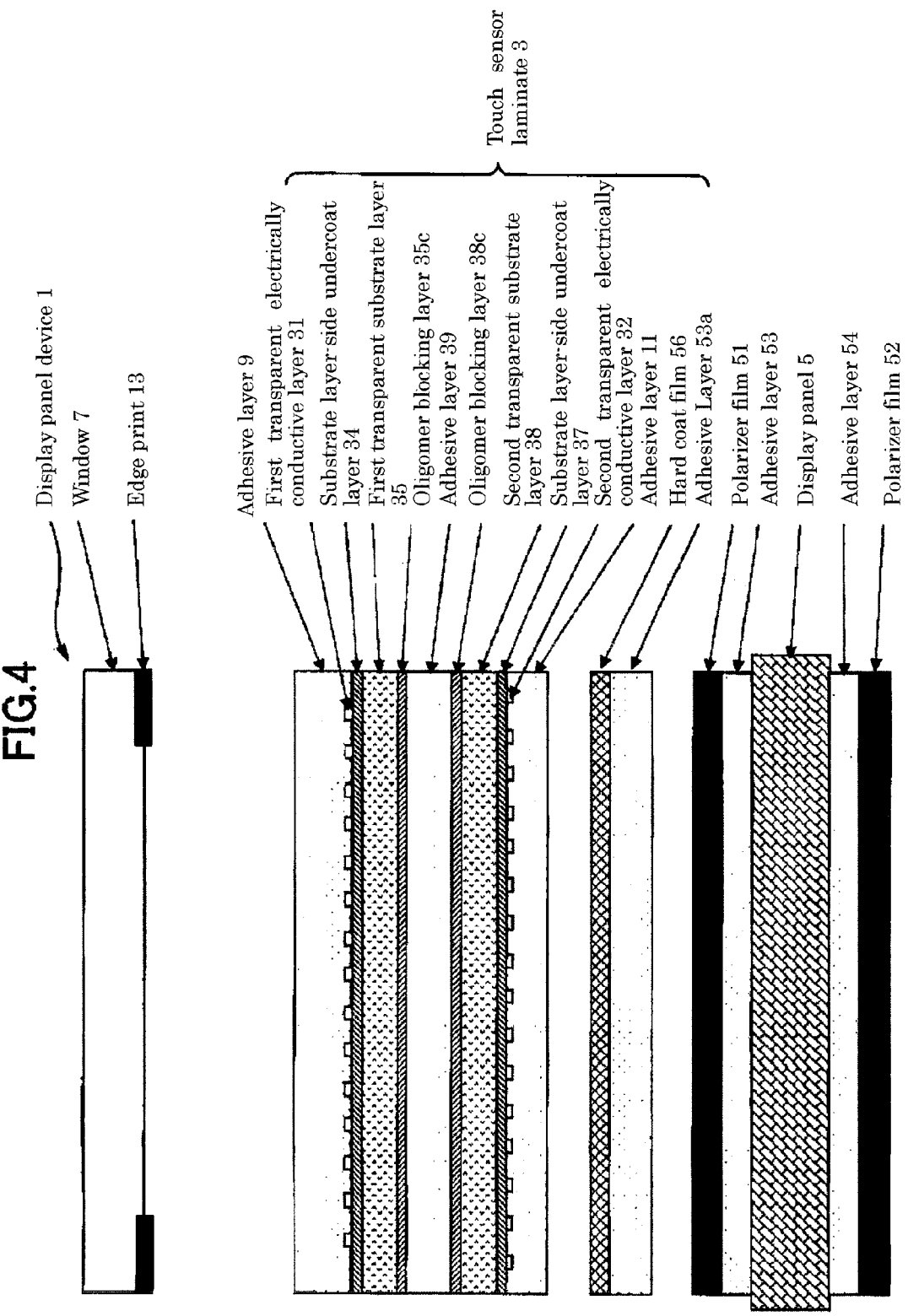
FIG. 4 is a sectional view illustrating another example in which a touch sensor laminate according to the present invention is employed in a display using a liquid crystal display panel as a display panel.
Figure 5:
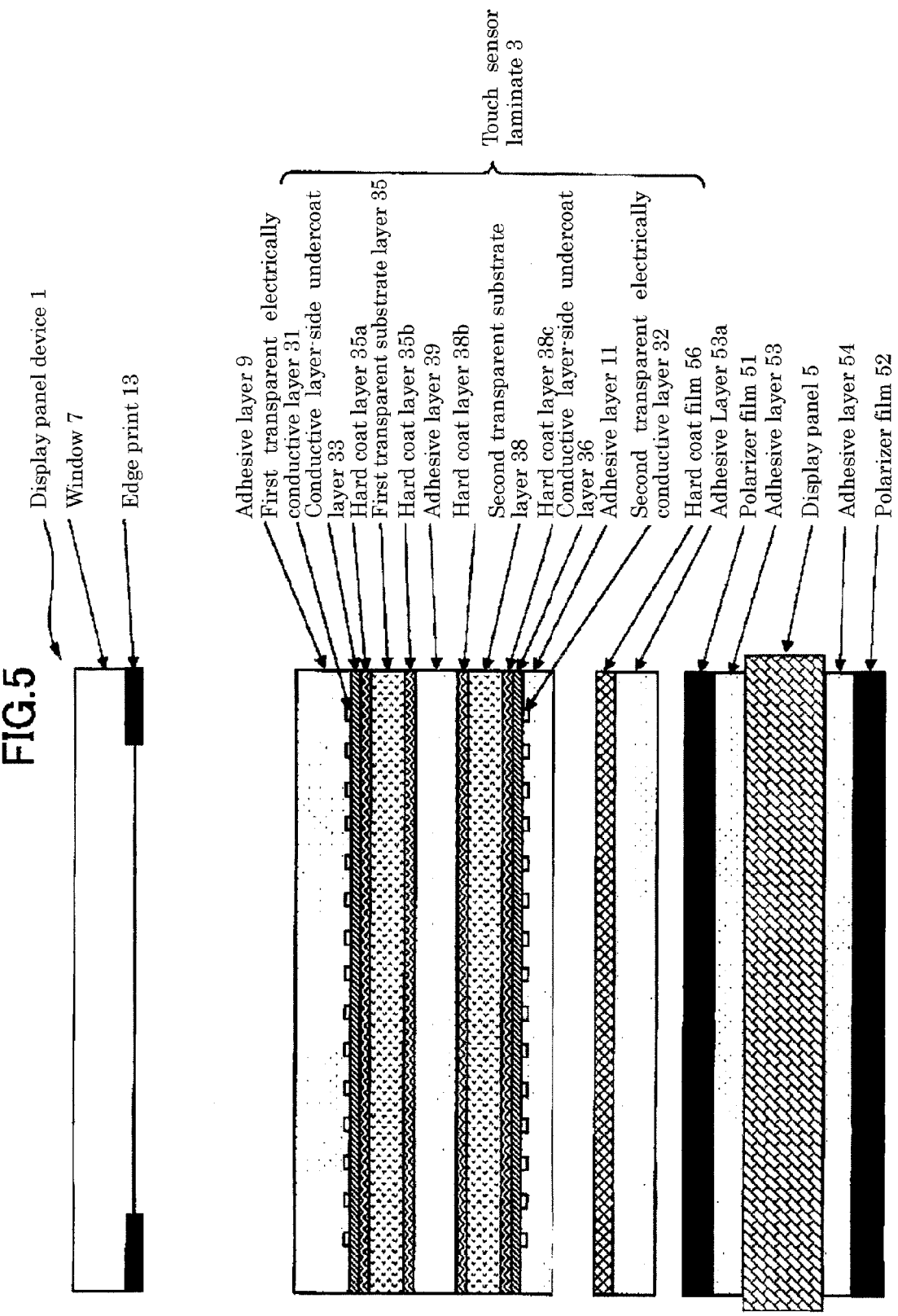
FIG. 5 is a sectional view illustrating yet another example in which a touch sensor laminate according to the present invention is employed in a display using a liquid crystal display panel as a display panel.

Referring to FIG. 1, a touch sensor laminate 3 according to one embodiment of the present invention comprises an optically transparent first electrically conductive layer 31 and an optically transparent second electrically conductive layer 32. The first electrically conductive layer 31 is disposed on an optically transparent substrate layer 35 through an optically transparent undercoat layer 33 and a hard coat layer 34. The undercoat layer 33 is disposed on the side of the first electrically conductive layer, and the hard coat layer 34 is disposed on the side of the substrate layer. Similarly, the second electrically conductive layer 32 is disposed on the substrate layer 35 through an optically transparent undercoat layer 36 and a hard coat layer 37. The first and second transparent electrically conductive layers 31, 32 are attached and formed, respectively, onto the conductive layer-side undercoats 33, 36, for example, by sputtering. This touch sensor laminate 3 makes up a capacitive touch input sensor unit. As is well known in this technical field, each of the first and second electrically conductive layers 31, 32 is patterned in a desired pattern.

In the embodiment of the present invention illustrated in FIG. 1, the substrate layer 35 is formed as a single layer made, for example, of an optically isotropic resin material. The hard coat layers 34, 37 are made of the same material, and formed, respectively, on opposite surfaces of the substrate layer 35 to have the same thickness. In another aspect of the present invention, the substrate layer 35 may be formed as a ¼ wavelength retardation layer. In this case, for example, when a person wearing polarized sunglasses uses a display equipped with the touch sensor according to this embodiment, it becomes possible to block internally reflected light from getting out of the touch sensor toward a viewing side.

Further, the undercoat layers 33, 36 are made of the same material, and formed, respectively, on outer surfaces of the hard coat layers 34, 37 to have the same thickness. Each of the undercoat layers 33, 36 functions as a refractive index adjusting layer for suppressing a situation where an electrode pattern formed by the transparent electrically conductive layer becomes visible from a viewing side. As described above, the hard coat layers 34, 37 on respective ones of the opposite sides of the substrate layer 35 are made of the same material and formed to have the same thickness, and the undercoat layers 33, 36 are made of the same material and formed to have the same thickness. Then, the transparent electrically conductive layers 31, 32 are formed, respectively, on outer sides of the undercoat layers 33, 36. That is, the touch sensor laminate 3 has a structure which is symmetrical in a thickness direction thereof, with respect to a center plane of the substrate layer 35 passing through a thicknesswise center of the substrate layer 35. The symmetrical structure makes it possible to effectively suppress warping deformation which would otherwise occur due to changes in temperature and humidity conditions.

FIG. 2 illustrates a touch sensor laminate according to another embodiment of the present invention. In this embodiment, a substrate layer 35 is composed of a PET film, and two hard coat layers 34, 37 are formed, respectively, on opposite surfaces of the substrate layer 35. An undercoat layer 33 (36) formed on an outer side of the hard coat layer 34 (37) comprises a first refractive index adjusting undercoat layer 33a (36a) on the side of the hard coat layer 34 (37), and a second refractive index adjusting undercoat layer 33b (36b) formed on an outer side of the first refractive index adjusting undercoat layer 33a (36a). Two electrically conductive layers 31, 32 are formed, respectively, on outer sides of the second refractive index adjusting undercoat layers 33b, 36b. The first refractive index adjusting undercoat layer 33a (36a) has a refractive index greater than the second refractive index adjusting undercoat layer 33b (36b). Preferably, the first refractive index adjusting undercoat layer 33a (36a) has a thickness of 35 nm or less, and the second refractive index adjusting undercoat layer 33b (36b) has a thickness less than that of the first refractive index adjusting undercoat layer 33a (36a). More preferably, the thickness of the second refractive index adjusting undercoat layer 33b (36b) is set to be equal to or less than ½ of the thickness of the first refractive index adjusting undercoat layer 33a (36a). This configuration is significantly effective in suppressing visibility of the electrode pattern, i.e., pattern visibility. Each of the conductive layer-side undercoats 33, 36 is patterned in the same manner as that in a corresponding one of the electrically conductive layers 31, 32. Each of the conductive layer-side undercoats 33, 36 is made of a material having a refractive index less than that of a corresponding one of the substrate layer-side hard coat layers 34, 37. Further, each of the conductive layer-side undercoats 33, 36 is formed to have a thickness less than that of the corresponding one of the substrate layer-side hard coat layers 34, 37. The relationship between the conductive layer-side undercoat 33 and the substrate layer-side hard coat layer 34 in terms of refractive index and thickness makes it possible to significantly reduce the undesirable situation where the pattern of the first electrically conductive layer 31 disposed on a viewing side becomes visible through a window by reflected light from the first electrically conductive layer, i.e., a pattern visibility problem.

FIG. 3 illustrates one example of a display employing a touch sensor laminate according to one embodiment of the present invention. In this embodiment, a dielectric central substrate structure comprises a first transparent substrate layer 35 and a second transparent substrate layer 38. A hard coat layer 35a is formed on an outer surface of the first transparent substrate layer 35, and an undercoat layer 33 is formed on the hard coat layer 35a. A first transparent electrically conductive layer 31 is formed on the undercoat layer 33.

A hard coat layer 38a is formed on an outer surface of the second transparent substrate layer 38, and an undercoat layer 36 is formed on the hard coat layer 38a. A second transparent electrically conductive layer 32 is formed on the undercoat layer 36. The first transparent electrically conductive layer 31 and the second transparent electrically conductive layer 32 are bonded together by an optically transparent adhesive layer 39, through a hard coat layer 35b formed on an inner surface of the first transparent substrate layer 35, and a hard coat layer 38b formed on an inner surface of the second transparent substrate layer 38, to form a touch sensor laminate 3.

On the side of the first transparent electrically conductive layer 31, a polarizer film 51 is bonded to the touch sensor laminate 3 through an adhesive layer 21. A space between the polarizer film 51 and a window 7 is filled with an optically transparent adhesive layer 9. That is, the window 7 is bonded to the touch sensor laminate 3 through the adhesive layer 9, over the entire surface thereof. In the illustrated example, an edge print 13 is provided on the window 7 along an edge of an inner surface thereof. Thus, as seen in FIG. 3, a step is formed due to the edge print 13. However, in the configuration illustrated in FIG. 3, the window 7 is bonded to the touch sensor laminate 3 through the adhesive layer 9, over the entire surface thereof, so that the step arising from the edge print 13 is filled with an adhesive of the adhesive layer 9. Thus, in the illustrated example, no air gap is formed between the window 7 and the touch sensor laminate 3, so that it becomes possible to suppress internal reflection which would otherwise be caused by an air gap therebetween. Therefore, this configuration can further reduce the pattern visibility problem due to reflected light from the first transparent electrically conductive layer 31, as compared to the case where there is an air gap between the window 7 and the touch sensor laminate 3. In this example, a display panel 5 is composed of a liquid crystal display panel, and a polarizing film layer 52 is adhesively bonded to the liquid crystal display panel. The display panel 5 is bonded to the second transparent substrate layer 38 through an adhesive layer 11.

Figure 6:
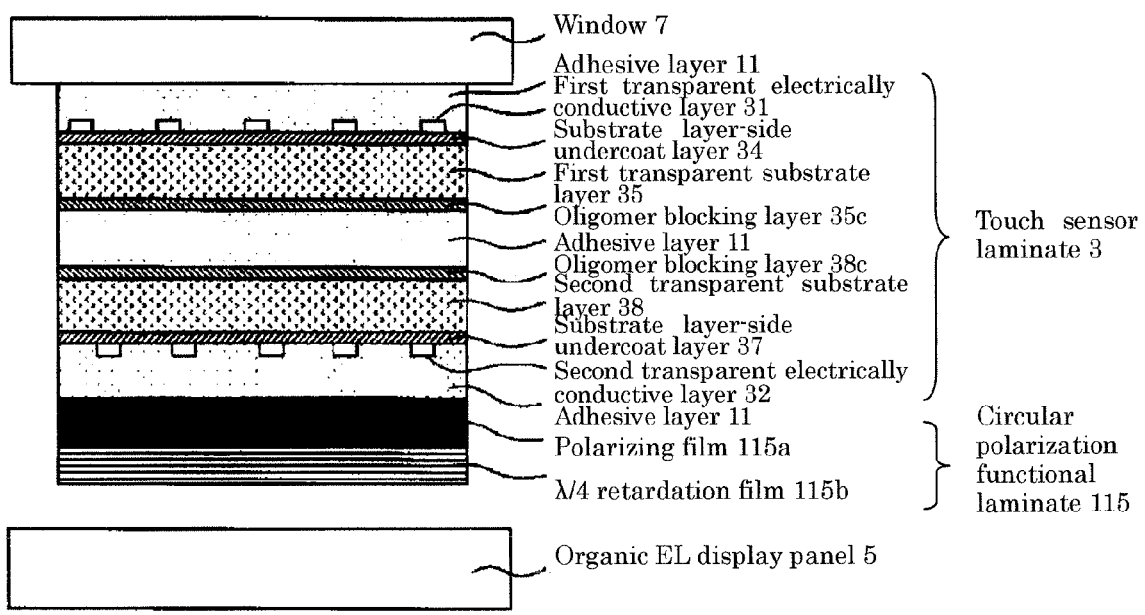
FIG. 6 is a sectional view illustrating one example in which a touch sensor laminate according to the present invention is employed in a display using an organic EL display panel as a display panel.

FIG. 6 illustrates one example in which an organic EL display panel is used as a display panel 5, and first and second transparent substrate layers 35, 38 of a touch sensor laminate 3 are made of a polyethylene terephthalate (PET) resin. The touch sensor laminate 3 has a first transparent electrically conductive layer 31 disposed on the first transparent substrate layer 35 made of PET through an undercoat layer 34, and a second transparent electrically conductive layer 32 disposed on the second transparent substrate layer 38 made of PET through an undercoat layer 37. An oligomer blocking layer 35c is disposed on a surface of the first transparent substrate layer 35 on a side opposite to the transparent electrically conductive layer 31, and an oligomer blocking layer 38c is disposed on a surface of the second transparent substrate layer 38 on a side opposite to the transparent electrically conductive layer 32. Further, a circular polarization functional laminate 115 is disposed between the touch sensor laminate 3 and the display panel 5. The circular polarization functional laminate 115 is composed of a polarizing film layer 115a, and a λ/4 retardation film layer 115b adhesively bonded to the polarizing film layer 115a. The polarizing film layer 115a is bonded to the touch sensor laminate 3 through an adhesive layer 11, and the λ/4 retardation film layer 115b is bonded to the display panel 5 through an adhesive layer. In this example, as with the embodiment illustrated in FIG. 1, the undercoat layers 34 (37) are provided respectively between the transparent substrate layers 35 (38) and the electrically conductive layers 31 (32), and patterned in the same manner as that for the electrically conductive layer 31 (32), so that the pattern visibility problem can be reduced.

An example of each layer for use in production of a display panel device of the present invention will be described in detail below.

(Formation of Optically Transparent Adhesive Layer)

Figure 7:
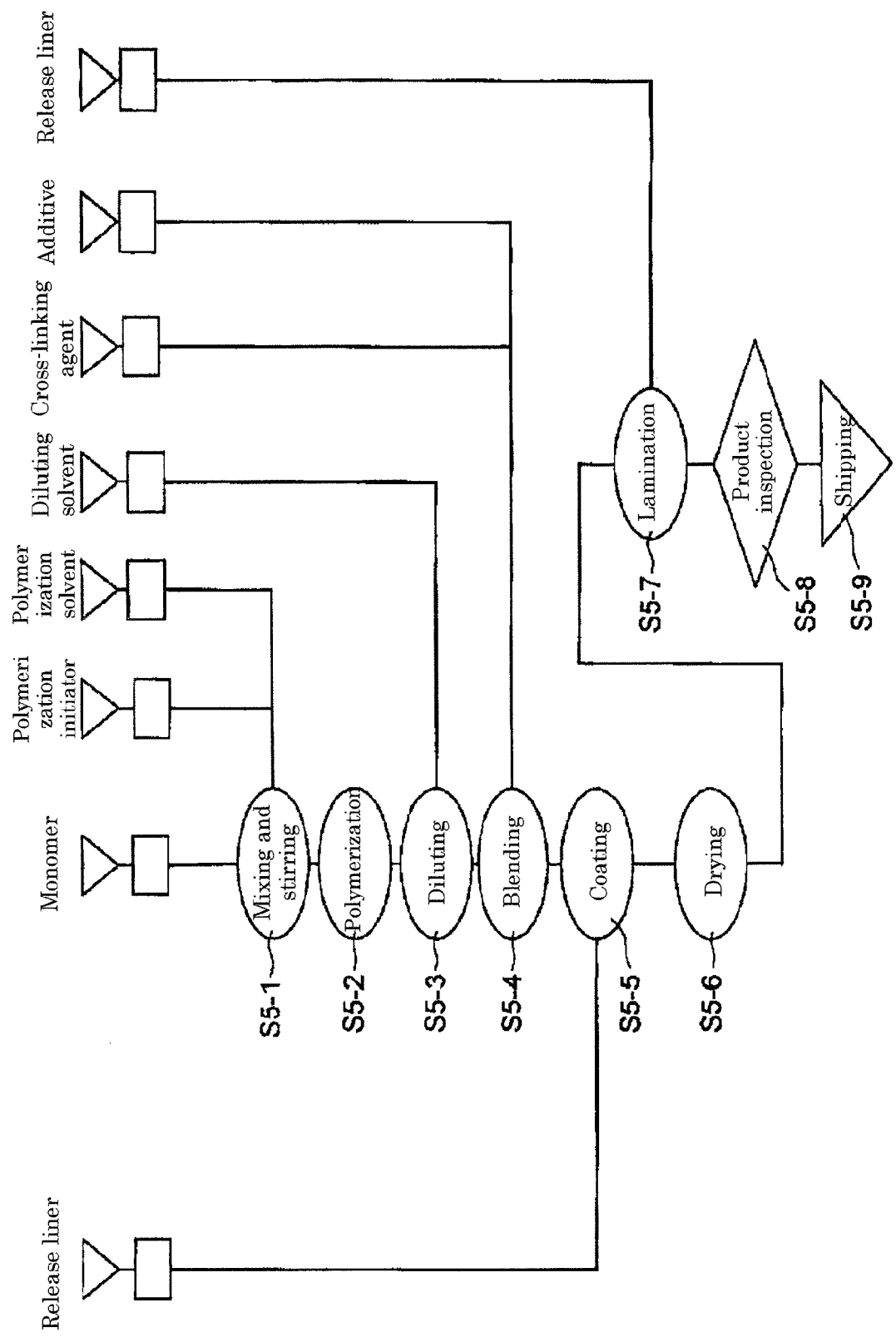
FIG. 7 is a process diagram illustrating a process of producing a sheet comprising an optically transparent adhesive layer.

FIG. 7 is a process diagram illustrating a process of producing an optically transparent adhesive layer usable in the present invention. First of all, a monomer as a basic raw material of an adhesive and a polymerization initiator are mixed and stirred together with a solvent. As the monomer, a mixture consisting of 70 weight parts of 2-methoxyethyl acrylate, 29 weight parts of 2-ethylhexyl acrylate, and 1 weight part of 4-hydroxybutyl acrylate is used. 0.2 weight parts of 2,2'-azobisisobutyronitrile is used as the polymerization initiator, and 100 weight parts of ethyl acetate is used as a polymerization solvent. These materials are put in a separable flask, and stirred for one hour while introducing nitrogen gas thereinto (S5-1). After removing oxygen in a polymerization system in the above manner, the solution is heated up to 63° C. to conduct a reaction for 10 hours (S5-2), and then toluene is added to obtain an acrylic-based polymer solution having a solid content concentration of 25 weight % (S5-3). This acrylic-based polymer solution will hereinafter be referred to occasionally as "acrylic-based polymer solution A". Further, an acrylic-based polymer contained in the acrylic-based polymer solution A will hereinafter be referred to occasionally as "acrylic-based polymer A". A weight-average molecular weight Mw of the acrylic-based polymer A is 1500,000. The weight-average molecular weight Mw can be measured by a gel permeation chromatography (GPC). Specifically, as a GPC measurement device, "HLC-8120 GPC" (trade name, produced by Tosoh Corporation) may be used. The weight-average molecular weight Mw can be obtained as a value on a polystyrene equivalent basis by performing a measurement under the following GPC measurement conditions.

GPC Measurement Conditions

Concentration of sample: 0.2 weight % (tetrahydrofuran solution)

Injection amount of sample: 10 μL

Eluant: tetrahydrofuran (THF)

Flow rate (flow velocity): 0.6 mL/min

Column temperature (measurement temperature): 40° C.

Column: "TSKgelSuper HM-H/H4000/H3000/H2000 (trade name, produced by Tosoh Corporation)

Detector: differential refractometer (RI)

Figure 8:
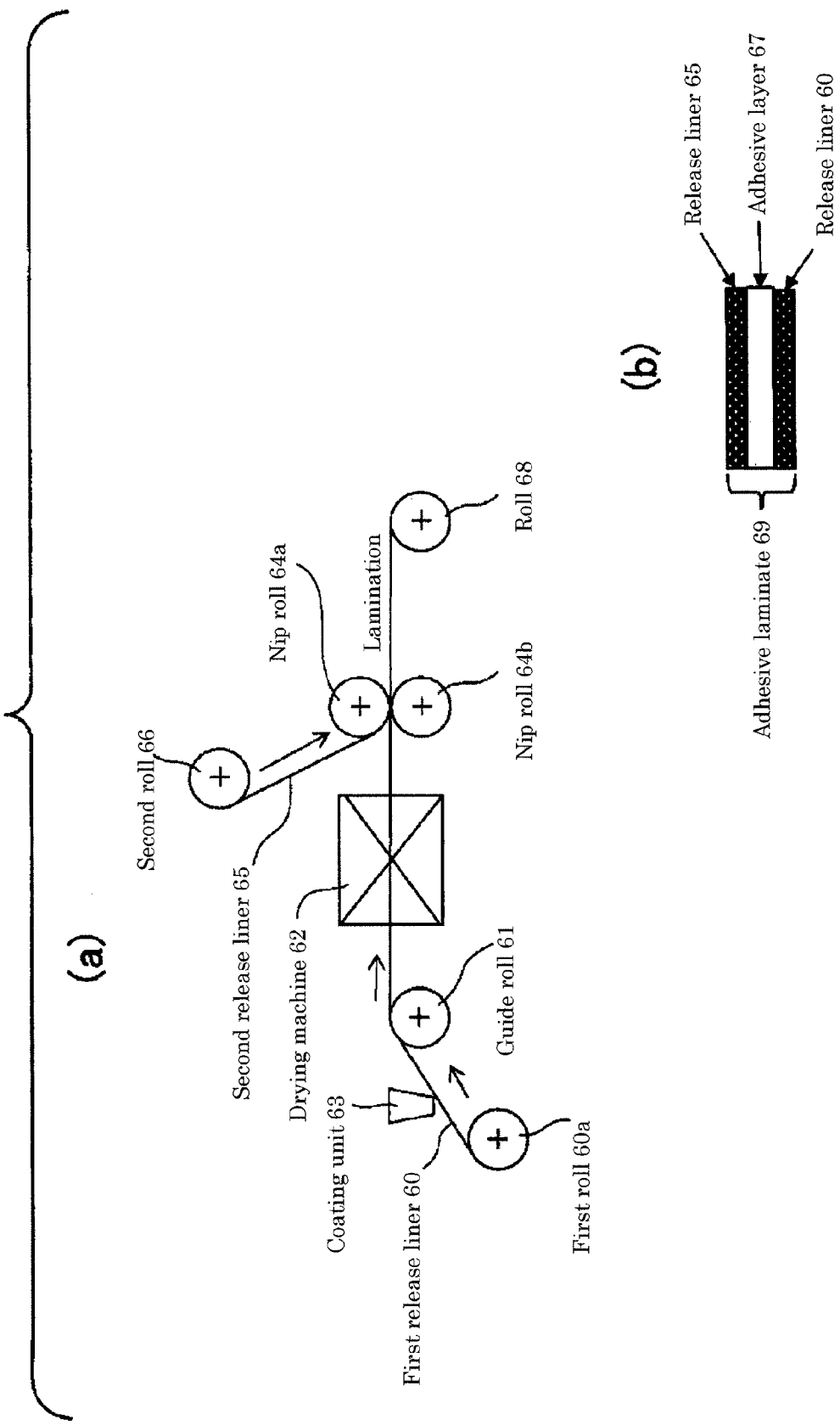

A cross-linking agent and an additive are blended with the polymerized acrylic-based polymer to obtain an adhesive composition (S5-4). As the cross-linking agent, a multifunctional isocyanate compound (trade name "CORONATE L" produced by Nippon Polyurethane industry Co., Ltd.) is added to 100 weight parts of the acrylic-based polymer solution A (100 weight parts of the acrylic-based polymer A) in an amount of 0.3 weight parts to prepare an adhesive composition in a solution form. The adhesive composition obtained in this manner is coatingly applied to a release liner (S5-5). FIG. 8(a) is a schematic diagram illustrating a coating station for this step. In this station, a release liner 60 is prepared in the form of a roll 60a, and fed to a drying machine 62 via a guide roll 61. In the course of reaching the guide roll 61, the adhesive solution prepared in the above step is applied from a coating unit 63 to the release liner 60 unrolled from the roll 60a, to form a layer thereon.

In this example, a 38 μm-thick polyethylene terephthalate (PET) film having a surface subjected to a release treatment is used as the release liner 60. The adhesive solution is applied to the release-treated surface of the release liner 60 to allow the adhesive layer to have a dried thickness of 25 μm. The release liner 60 applied with the adhesive solution is fed to pass through a drying machine 62 to vaporize the solvent of the adhesive solution. The release liner 60 existing from the drying machine 62 is fed to pass through a pair of nip rolls 64a, 64b. A second release liner 65 unrolled from a second roll 66 is concurrently fed to the nip rolls 64a, 64b in such a manner as to be superimposed with respect to the adhesive layer formed on the first release liner 60, and pressed against and bonded to the adhesive layer by the nip rolls 64a, 64b. The second release liner 65 is formed by the same film as that of the first release liner 60, and a surface thereof to be bonded to the adhesive layer is subjected to a release treatment so as to allow a peel force of the second release liner 65 with respect to the adhesive layer to become smaller than that of the first release liner 60.

A laminate exiting from the first nip rolls 64a, 64b is formed to have a structure in which the first and second release liners 60, 65 are laminated, respectively, on opposite sides of the adhesive layer 67 as illustrated in FIG. 8(b), and wound as a roll 68. In FIG. 7, a step of the drying is indicated as S5-6, and a step of the lamination of the second release liner 65 is indicated as S5-7. The produced adhesive laminate 69 is shipped (S5-9) via product inspection (S5-8).

(Formation of Polarizer Film)

Figure 9:
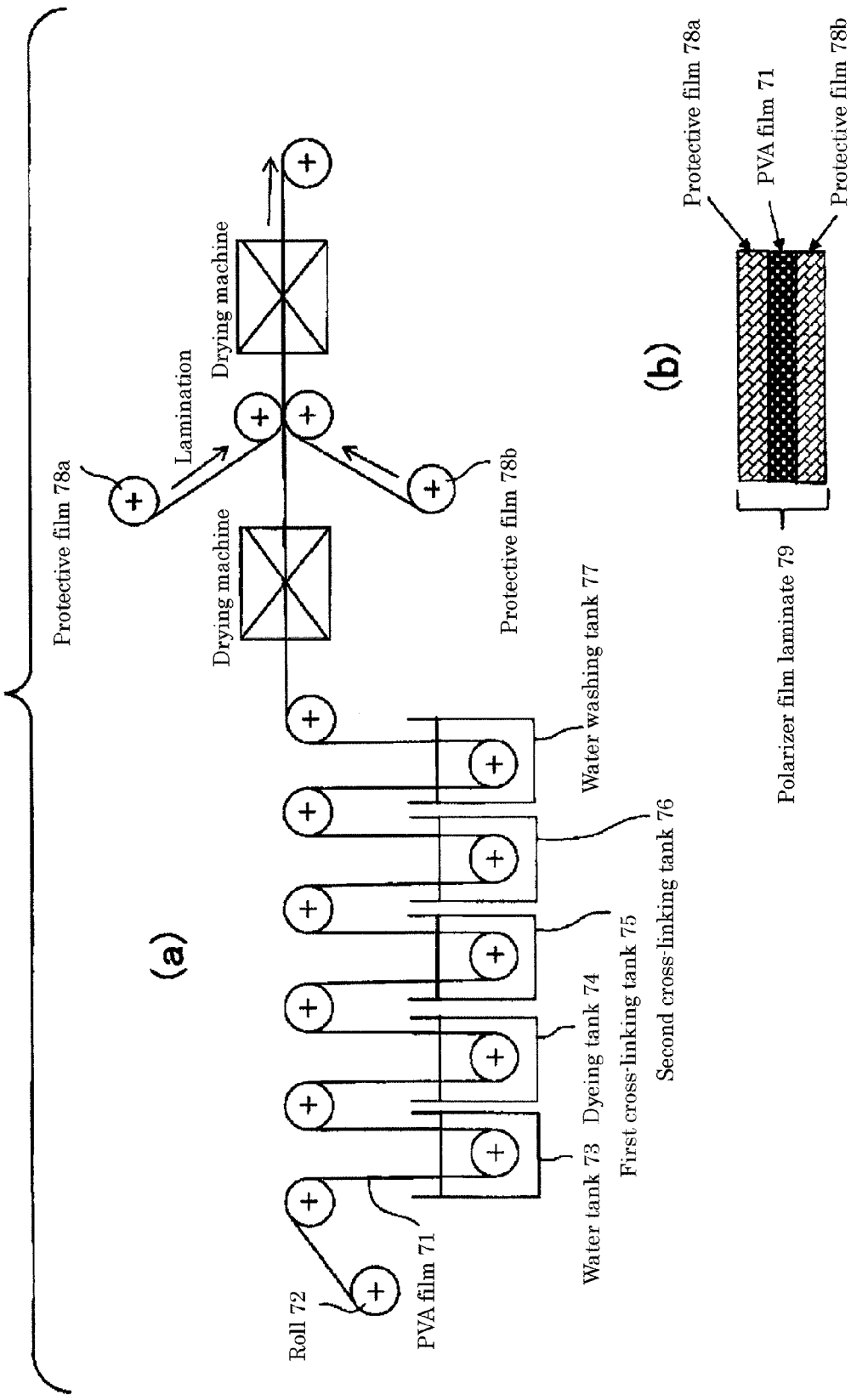

FIGS. 9(a) and 9(b) illustrate a production station for a polarizer film. A film 71 as a raw material is made of a polymer material consisting primarily of a polyvinyl alcohol (PVA)-based resin, and prepared in the form of a roll 72. The PVA film 71 unrolled from the roll 72 is immersed in water in a water tank 73 to swell with water. Then, the water-swelled PVA film 71 is fed to pass through a dyeing tank 74 having an iodine-containing dyeing solution, so that, in the tank 74, it is impregnated with iodine. Then, the PVA film 71 impregnated with iodine is fed to pass through first and second cross-linking tanks 75, 76. In the cross-linking tanks 75, 76, a cross-linking bath containing potassium iodide and boric acid is formed, and a cross-linking treatment is promoted therein. During the course of the cross-linking treatment, the PVA film 71 is subjected to stretching. This stretching is performed by setting respective drive speeds of inlet-side and outlet-side rolls for feeding the PVA film 71 in such a manner that the drive speed of the outlet-side roll becomes greater than that of the inlet-side roll. The PVA film 71 subjected to the stretching is washed with water in a water washing tank 77, and then two protective films 78a, 78a are laminated, respective, to opposite surfaces of the stretched PVA film 71 to form a laminate 79 as illustrated in FIG. 9(b).

(Formation of Retardation Film)

A retardation film can be prepared by controlling a stretch ratio and a stretch temperature of a resin film. The stretch ratio may be appropriately determined depending on a desired retardation value, a film thickness required for optical compensation of a retardation film, a type of resin to be used, a thickness of a film to be used, a stretch temperature, etc. Production of such a retardation film is well known. A ¼ λ retardation film usable in the present invention is prepared using the well-known technique to produce a retardation corresponding to a ¼ λ phase.

(Formation of Polarization Functional Laminate)

Figure 10:
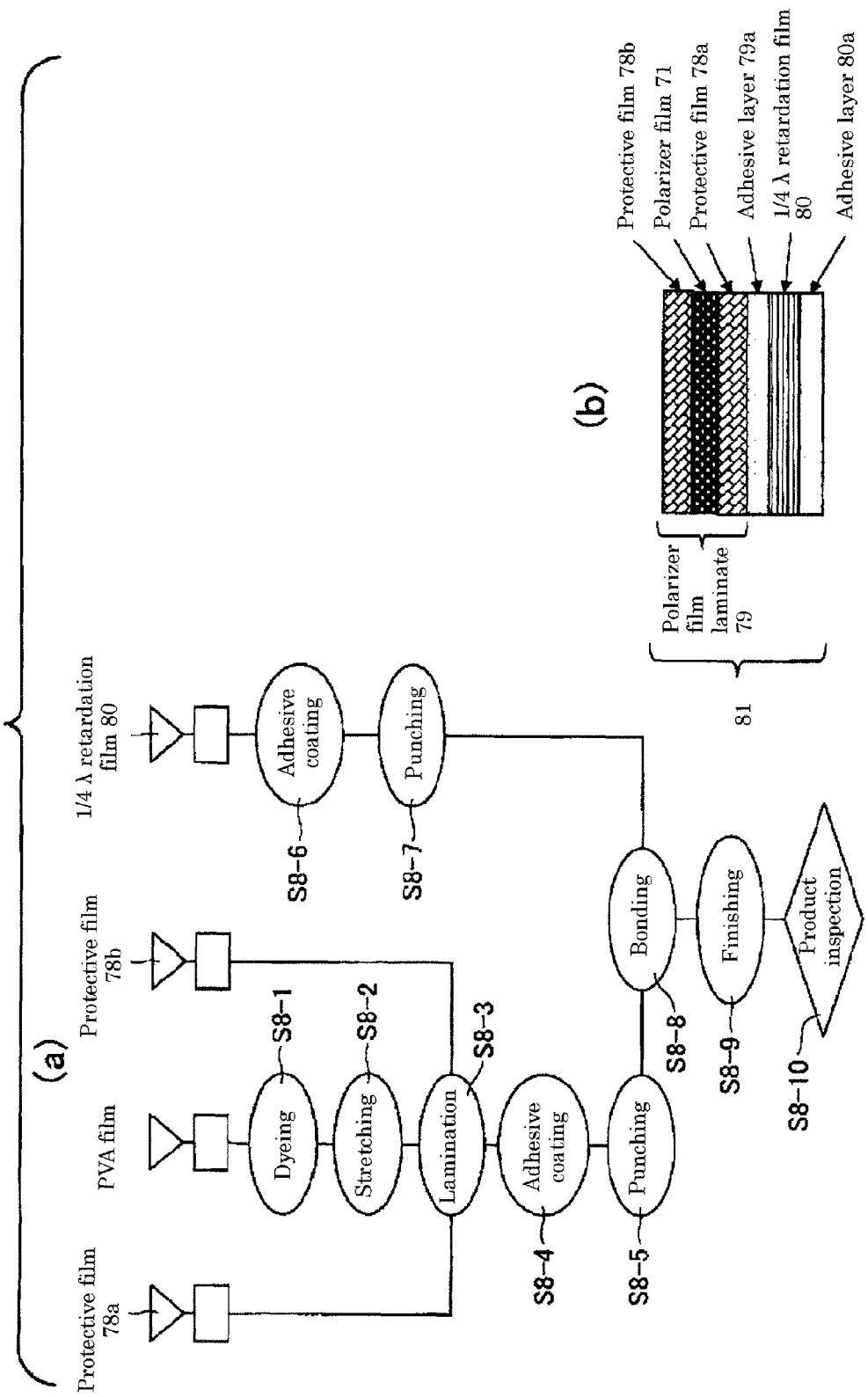

A polarization functional laminate usable in the present invention is obtained by laminating the ¼ λ retardation film formed in the above manner to the polarizer laminate 79 illustrated in FIG. 9(b). FIG. 10(a) illustrates a process of laminating the polarizer laminate 79 and the ¼ λ retardation film together. Firstly, a PVA film as a substrate for a polarizer film is formed as the polarizer film 71 illustrated in FIG. 7 via a dyeing step (S8-1) of performing dyeing by iodine and a stretching step (S8-2), and fed to a lamination step (S8-3) of laminating the protective films 78a, 78b thereto. In the lamination step (S8-3), the protective films 78a, 78b are laminated, respectively, to opposite surfaces of the polarizer film 71. Then, an adhesive is coatingly applied to one surface of the polarizer film 71 (S8-4). According to need, the polarizer film 71 coated with the adhesive is cut into a size corresponding to a size of a display panel device intended to use the polarizer film, for example, by punching (S8-5). In cases where the display panel device is an elongate type prepared in a roll form and used in a station for continuous lamination to display panel boards, this cutting step is omitted.

After subjecting the ¼ λ retardation film to adhesive coating (S8-6), it is cut into a size corresponding to that of the display panel device (S8-7). In cases where the display panel device is an elongate type prepared in a roll form and used in a station for continuous lamination to display panel boards, this cutting step is omitted, as in the polarizer film laminate 79. The retardation film cut according to need is laminated to the polarizer film laminate 79 in such a manner that a surface thereof subjected to no adhesive coating is bonded to the laminate 79 through an adhesive layer on the laminate 79 (S8-8). The obtained product is subjected to necessary finishing, such as shaping of edges (S8-9), and transferred to a next station via production inspection (S8-10). FIG. 10(b) illustrates an obtained polarization functional laminate 81, wherein the polarizer film laminate 79 is bonded to the ¼ λ retardation film 80 through the adhesive layer 79a. An adhesive layer 80a exists on an outer surface of the ¼ λ retardation film 80. According to need, a release liner (not illustrated) is laminated to the adhesive layer 80a on the outer surface of the ¼ λ retardation film 80. In this polarization functional laminate 81, the polarizer film laminate 79 and the ¼ λ retardation film 80 are combined in this order when viewed from the viewing side. Thus, the polarization functional laminate 81 has a circularly polarizing function.

(Formation of Touch Sensor Laminate)

A basic element layer of the touch sensor laminate 3 is composed of a transparent substrate layer, an undercoat layer, an adhesive layer and a transparent electrically conductive layer. A material for forming the substrate layer is not particularly limited, but various types of plastic films having transparency may be employed. For example, the material for the substrate layer includes a polyester-based resin, a acetate-based resin, a polyether sulfone-based resin, a polycarbonate-based resin, a polyamide-based resin, a polyimide-based resin, a polyolefin-based resin, a (meth) acrylic-based resin, a polyvinyl chloride-based resin, a polyvinylidene chloride-based resin, a polystyrene-based resin, a polyvinyl alcohol-based resin, a polyarylate-based resin, and a polyphenylene sulfide-based resin. Among them, a particularly preferable material includes a polyester-based resin, a polycarbonate-based resin, and a polyolefin-based resin. As for the material for the substrate layer, there is a detailed description in the Patent Document 5. While any material described therein may be used, a polyethylene terephthalate (PET) film is commonly used. As a commercially available PET film, there are films produced by Mitsubishi Polyester, Inc. Specifically, two types of films having the same width (1085 mm) and different thicknesses (23 μm and 50 μm) are available. A PET film provided with an oligomer blocking layer for blocking oligomer generated by heat received during a lamination process is available. In a configuration where the touch sensor laminate is arranged inside with respect to the polarization functional laminate when viewed from the viewing side, it is preferable that the substrate layer is made of a polycarbonate or norbornene-based resin, instead of PET.

Figure 11:
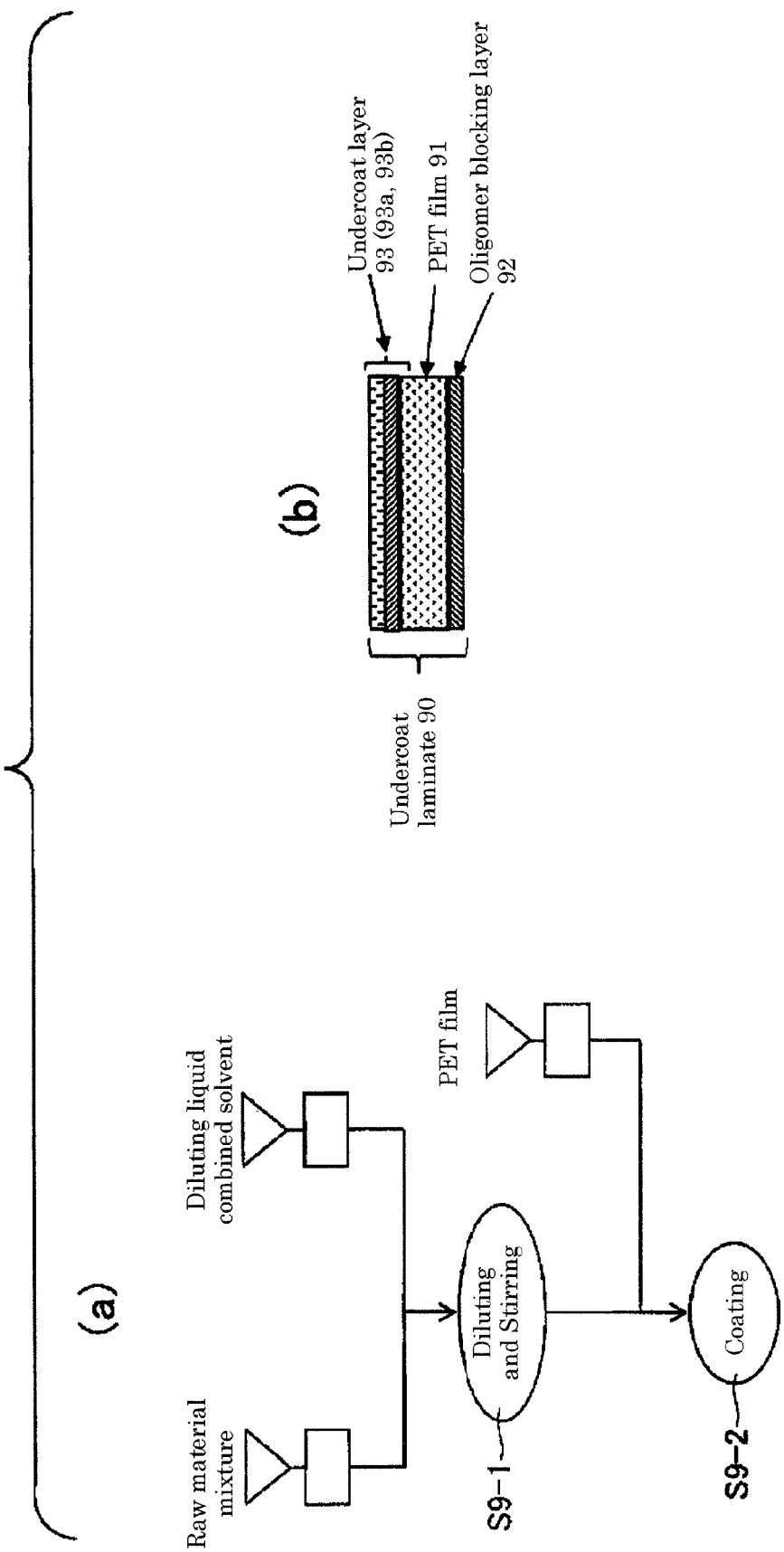

The undercoat layer may be formed by any method described in the Patent Document 5. FIG. 11(a) illustrates an undercoat layer coating process. For example, as a material for the undercoat layer, it is possible to use a mixture obtained by mixing a melamine resin, an alkyd resin and an organic silane condensate at a weight ratio of 2:2:1. This mixture contains a solid content at a weight ratio of 30%, and is available from Momentive Performance Materials, Inc., as the trade name "SHC 900". This undercoat raw material mixture is diluted by adding a diluting liquid combined solvent thereto, and the diluted mixture is stirred (S9-1). For example, this solvent may be prepared by mixing cyclopentanone, toluene and methyl ethyl ketone at a weight ratio of 4:3:3. A mixing rate of the solvent is determined to allow a solid content of the undercoat raw material mixture to be set to 1.5 weight %. The diluted undercoat raw material mixture is applied to a surface of the PET film on a side opposite to an oligomer blocking layer preliminarily formed on the other surface thereof (S9-2). Through this process, as illustrated in FIG. 11(b), an undercoat laminate 90 is formed which comprises an oligomer blocking layer 92 formed on one surface of a PET film 91, and an undercoat layer 93 formed on the other surface of the PET film 91. According to need, a second undercoat layer may be formed on the undercoat layer 93. In FIG. 11(b), the reference codes 93a, 93b noted in brackets indicate an undercoat formed in a two-layer structure.

Then, a sputtering process is performed to form the electrically conductive layer on the undercoat laminate 90 obtained in the above manner. FIG. 12(a) is a block diagram illustrating one example of the sputtering process. A sputtering target material consisting of 90 weight % of indium oxide and 10 weight % of tin oxide is sputtered against a surface of an outer undercoat layer 93b of the undercoat laminate 90 formed by the process in FIG. 11(a), in a vacuum atmosphere under a condition that an introduced gas consisting of 98 volume % of argon and 2 volume % of oxygen is excited into a plasma state (S10-1). In this way, an electrically conductive laminate 100 illustrated in FIG. 12(b) is obtained in which an electrically conductive layer 101 is formed on the undercoat layer 93b. A release liner is laminated to the electrically conductive laminate 100 through an adhesive layer (S10-2). FIG. 12(c) illustrates an adhesive layer-laminated electrically conductive laminate 104 obtained in this process. As illustrated in FIG. 12(c), the adhesive layer-laminated electrically conductive laminate 104 has a laminate structure in which the first undercoat layer 93a and the second undercoat layer 93b are formed on one surface of the substrate layer 91 in this order, wherein the electrically conductive layer 101 is formed on the second undercoat layer 93b, and a release liner 103 is bonded to the other surface of the substrate layer 91 on a side opposite to the first undercoat layer 93 through an adhesive layer 102.

Figure 13:
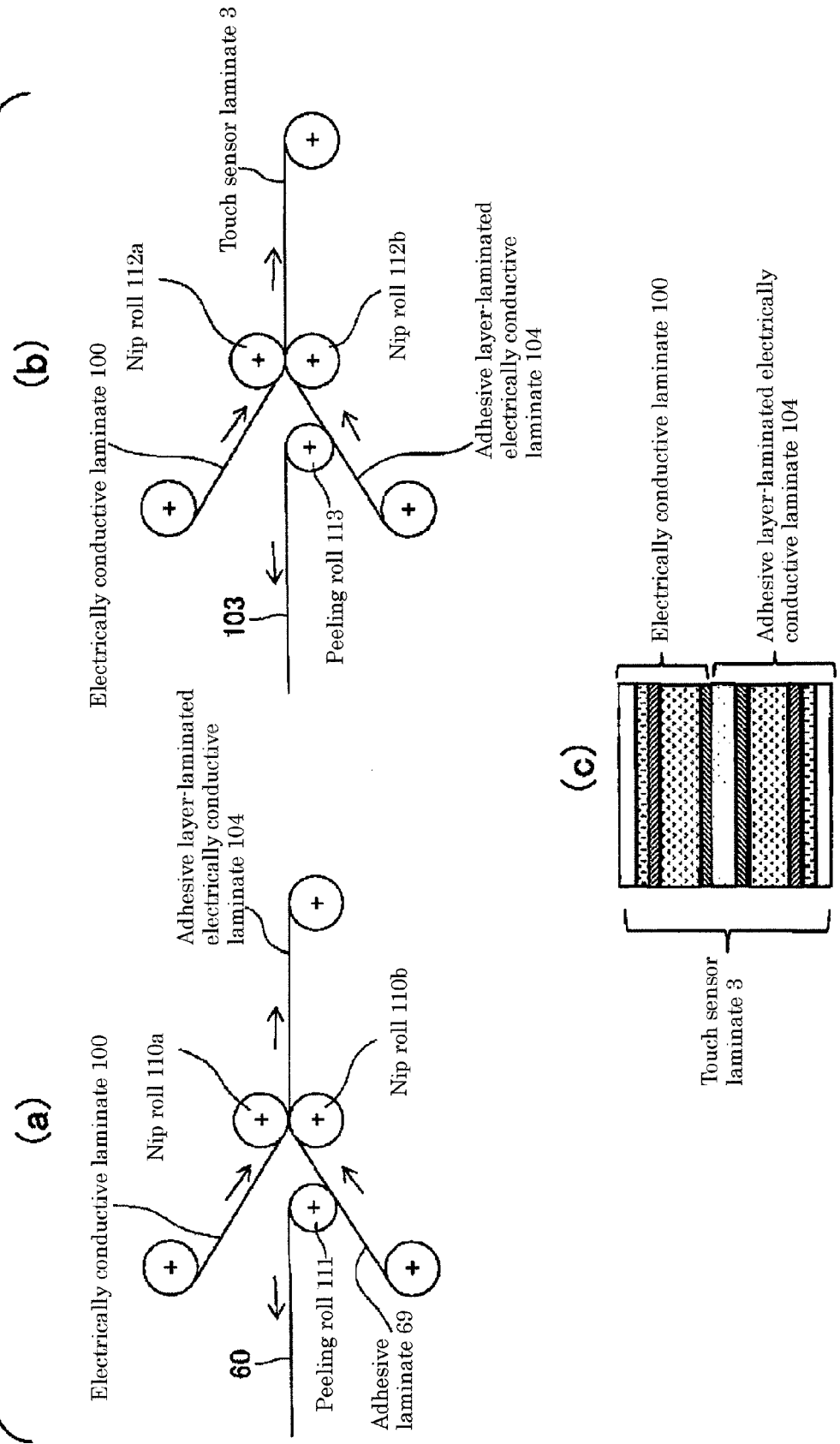
FIGS. 13(a), 13(b) and 13(c) are, respectively, a schematic diagram of a process for forming an electrically conductive laminate having an adhesive layer thereon, a schematic diagram illustrating a process for laminating an electrically conductive laminate to the electrically conductive laminate having an adhesive layer thereon, and a sectional view of a touch sensor laminate to be obtained.

FIG. 13(a) is a schematic diagram illustrating a process for laminating the adhesive layer 102 in FIG. 12(c). In FIG. 13(a), the electrically conductive laminate 100 and the adhesive laminate 69 formed by the station illustrated in FIG. 8(a) are unrolled, respectively, from their rolls, and fed to pass through between a pair of nip rolls 110a, 110b. The electrically conductive laminate 100 is fed from the roll to allow the oligomer blocking layer 92 to face the adhesive laminate 69. The adhesive laminate 69 is also prepared in the form of a roll, and fed to pass through between the nip rolls 110a, 110b, while peeling the release liner 60 provided on one side by a peeling roll 111 and allowing the exposed adhesive layer 67 to face the electrically conductive laminate 100. In this way, the adhesive layer-laminated electrically conductive laminate 104 illustrated in FIG. 12(c) is obtained. This adhesive layer-laminated electrically conductive laminate 104 is wound in a roll form as illustrated in FIG. 13(a). The electrically conductive laminate 100 illustrated in FIG. 12(b) is laminated to the adhesive layer-laminated laminate 104 to form a touch sensor laminate 3. FIG. 13(b) is a schematic diagram illustrating a station for the lamination. In FIG. 13(b), the electrically conductive laminate 100 is prepared in the form of a roll. The electrically conductive laminate 100 is unrolled, and fed to pass through a pair of nip rolls 112a, 112b, in a posture where the oligomer blocking layer 92 on the substrate layer 91 is located on a lowermost side. The adhesive layer-laminated electrically conductive laminate 104 is unrolled in a posture where the release liner 103 is located on an uppermost side, and fed to pass through the nip rolls 112a, 112b, while peeling the release liner 103 by a peeling roll 113 and allowing the exposed adhesive layer 102 to face the electrically conductive laminate 100. The laminates 100, 104 are pressed against each other and bonded together by the nip rolls 112a, 112b to form a touch sensor laminate. The electrically conductive layers 101 on opposite surfaces of the touch sensor laminate are heated and crystallized, for example, by feeding it to pass through a drying oven, and then patterned into a desired pattern by a well-known etching process. The pattering process is well known, as described in detail, for example, in the Patent Document 6, and its detailed description will be omitted here. Through patterning of the electrically conductive layers, the touch sensor laminate 3 usable in the display panel devices illustrated in FIGS. 3 to 6 can be obtained. A cross-section of the touch sensor laminate is illustrated in FIG. 13(c).

Figure 14:
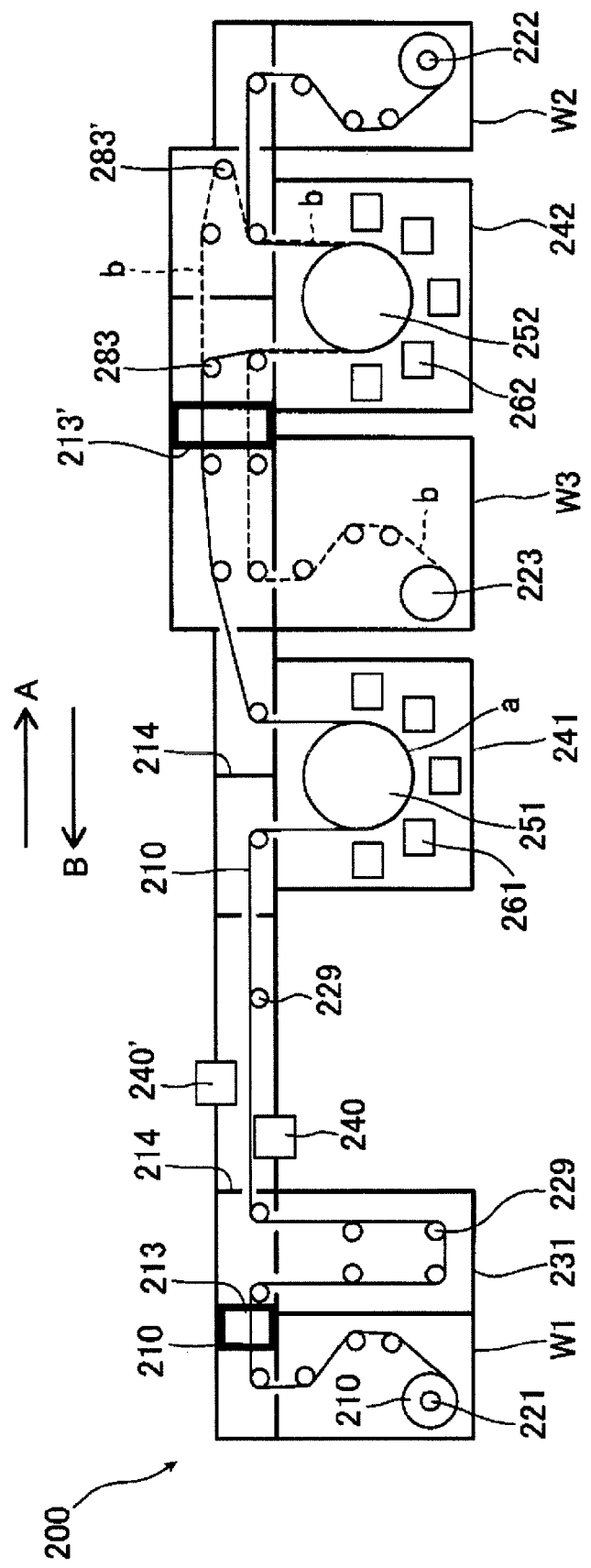
FIG. 14 is a sectional view illustrating a continuous station for forming a transparent electrically conductive layer on each of opposite surfaces of a substrate layer.
Figure 15:
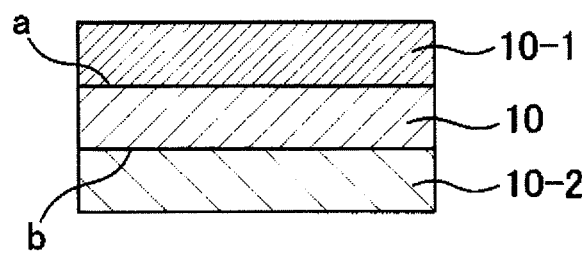
FIG. 15 is a sectional view illustrating one example of a laminate produced by the station illustrated in FIG. 14.

FIG. 14 illustrates one example of a film formation apparatus 200 capable of forming a transparent electrically conductive layer on each of the opposite surfaces of the substrate layer 35 composed of a single film. The film formation apparatus 200 comprises: a first roll chamber W1, a second roll chamber W2 and a third roll chamber W3 each capable of housing an elongated substrate film 210 wound in a roll form; a first film formation chamber 241 provided between the first roll chamber W1 and the third chamber W3; a second film formation chamber 242 provided between the third roll chamber W3 and the second roll chamber W2; a heating chamber 231 provided between the first roll chamber W1 and the first film formation chamber 241; two plasma treatment devices 240, 240' provided between the heating chamber 231 and the first film formation chamber 241; and two switching rolls 283, 283' for changing a path of the substrate film 210.

As illustrated in FIG. 14, during a course of feeding of the substrate film 210 in a first direction A directed from the first roll chamber W1 toward the second roll chamber W2, the substrate film 210 is moved along a fixed path until it reaches the switching roll 283. Then, after reaching the switching roll 283, in a first feed path, the substrate film 210 is turned around by the switching roll 283' and thereby fed to pass through the second film formation chamber 242 in a second direction B directed from the second roll chamber W2 to the first roll chamber W1, as indicated by the broken line, whereas, in a second feed path, the substrate film 210 is fed to pass through the second film formation chamber 242 in the first direction A, as indicated by the solid line.

The film formation apparatus 200 in FIG. 14 is usable for any process such as a vacuum vapor deposition process, a sputtering process, and a chemical vapor deposition (CVD) process. When used for the sputtering process, sputtering can be performed uniformly and over a wide area, thereby making it possible to form a dense thin film, with high continuous productivity and excellent production stability. In the sputtering process, particularly, DC Magnetron Sputtering, is capable of forming a magnetic field on a surface of a target to confine electrons therearound so as to suppress damage to the substrate film. Such treatments are performed with keeping each chamber in a vacuum state.

In order to effectively maintain the vacuum state, a partition 214 is provided between adjacent ones of the chambers of the film formation apparatus 200. Each of the partitions 214 is provided with a slit 213 for allowing the substrate film 210 to pass therethrough. Further, in order to effectively maintain a vacuum state of a region in each of the chambers other than an operating space, a load lock mechanism 13 (13') may be provided at a given position. The load lock mechanism is well known, and its description will be omitted here.

The substrate film 210 usable in this process may be any type of resin film such as a PET film. However, the substrate film 210 is formed in a generally elongate shape, and made of a material having flexibility enough to be wound into a roll form. During the film formation, the substrate film 210 can be fed between the first roll chamber W1 and the third roll chamber W3, in the first direction A directed from the first roll chamber W1 toward the second roll chamber W2, or in the second direction B directed from the second roll chamber W2 toward the first roll chamber W1, for example, by using an array of guide rollers 229.

In order to support the substrate film 210 in a roll form, a first feed/take-up roll 221, and a second feed/take-up roll 222 are provided in the first roll chamber W1 and the second roll chamber W2, respectively. When the substrate film 210 is fed in the first direction A, the first feed/take-up roll 221 performs an unrolling (feed-out) operation, and the second feed/take-up roll 222 performs a rolling-up (take-up) operation. On the other hand, when the substrate film 210 is fed in the second direction B, the second feed/take-up roll 222 performs an unrolling (feed-out) operation, and the first feed/take-up roll 221 performs a rolling-up (take-up) operation.

In the heating chamber 231, the substrate film 210 is heated and subjected to a treatment such as a degassing treatment and/or an annealing treatment. For example, in the heating chamber 231 provided between the first roll chamber W1 and the first film formation chamber 241, the substrate film 210 can be heated and degassed before film formation in the first film formation chamber 241. During a vacuum process or the like, water is likely to arise from the substrate film 210. In this case, such water exerts a large influence on a composition of a film to be formed. The heating chamber 231 provided at the above position can remove water to reduce the influence.

Another heating chamber (not shown) may be provided between the second film formation chamber 242 and the second roll chamber W2. In this case, for example, the substrate film 210 after being subjected to film formation in the second film formation chamber 242 can be heated, so that a transparent electrically conductive film formed on the substrate film 210 is subjected to annealing, thereby allowing the electrically conductive film to have an atomic arrangement for an orderly arrangement of crystal grains. Alternatively or additionally, a heating chamber may be provided, for example, between the first film formation chamber 241 and the second film formation chamber 242, according to need. However, the same effect can be obtained, for example, by utilizing a heating function of an aftermentioned rotary drum in the film formation chamber, without providing any heating chamber.

The plasma treatment devices 240, 240' are used to subject the substrate film 210 to a plasma treatment. The plasma treatment allows a surface of the substrate film 210 to be activated and cleaned, thereby allowing the subsequent film formation to be more effectively performed. As with the heating chamber, an installation position of the plasma treatment device is not particularly limited. For example, the plasma treatment devices 240, 240' provided between the heating chamber 231 and the first film formation chamber 241 can be used to subject the substrate film 210 to the plasma treatment before the film formation in the first film formation chamber 241. Alternatively or additionally, a plasma treatment device may be provided, for example, between the first film formation chamber 241 and the second film formation chamber 242, according to need.

It is only necessary to provide at least two film formation chambers. However, an additional film formation chamber may be provided. An installation position of the additional film formation chamber is not particularly limited as long as it is located between the first roll chamber W1 and the second roll chamber W2. For example, the additional film formation chamber may be provided between the heating chamber 231 and the first film formation chamber 241. In this example, a film to be formed in each of the film forming chambers is a transparent electrically conductive layer.

The first film formation chamber 241 comprises a first rotary drum 251 and a first cathode electrode 261. The first rotary drum 251 is adapted to be rotatable to feed the substrate film 210 in the first direction A or the second direction B, so that the substrate film 210 is fed in the first direction A or the second direction B via a periphery of the first rotary drum 251. The first rotary drum 251 may have a function of heating the substrate film 210. An effect obtainable by the heating function of the first rotary drum 210 may be considered to be equal to that of the heating chamber. Therefore, the first rotary drum 251 may be used as a substitute for the heating function of the heating chamber. Conversely, the heating function of the heating chamber may be substituted for the heating function of the first rotary drum 251.

The first cathode electrode 261 is provided in a plural number with respect to the first rotary drum 251. More specifically, each of the plurality of first cathode electrode 261 is movably disposed in opposed relation to the first rotary drum 251, while supporting a target for forming a film of a given material such as ITO.

(Verification of Pattern Visibility Suppressing Effect of Undercoat Layer)

[Testing Method]

<Refractive Index>

A refractive index of each layer was measured while allowing measurement light (sodium D-lines) to enter into each measurement surface, using an Abbe refractometer produced by Atago Co., Ltd., by a specified measurement method designated by the refractometer.

<Thickness of Each Layer>

As for a layer having a thickness of 1 μm or more, such as a film substrate, a transparent substrate, a hard coat layer and an adhesive layer, a thickness measurement was performed using a microgauge type thickness meter produced by Mitutoyo Corporation. As for a layer having difficulty in directly measuring a thickness, such as a hard coat layer and an adhesive layer, a thickness of the layer was obtained by measuring a total thickness of a substrate provided with each layer and subtracting a thickness of the substrate from the total thickness.

A thickness of each of a dielectric layer and an ITO film was calculated based on an interference spectrum waveform using Instantaneous Multichannel Photodetector system "MCPD-2000" (product name) produced by Otsuka Electronics Co., Ltd.

<Reflective Properties>

A reflectance in each of a pattern area and an area just below a pattern opening in an wavelength range of 380 nm to 780 nm was measured at internals of 5 nm under a condition that an incident angle with respect to the ITO film is set to 2 degree, using an integrating sphere measurement mode in a spectrophotometer "U-4100" (trade name) produced by Hitachi High Technologies Corporation. Then, an average reflectance in each of the pattern area and the area just below the pattern opening was calculated, and a difference ΔR between respective average reflectances in the pattern area and the area just below the pattern opening was calculated. The above measurement was performed in a state in which a light blocking layer is formed on a back surface of a touch sensor laminate (sample) (on the side of a PET film) by using a black color spray to almost eliminate reflection from the back surface of the sample and light incidence from the side of the back surface of the sample. Further, using a D65 light source, color coordinates (L*, a* and b*) of reflected light in each of the pattern area and the area just below the pattern opening were calculated, and a color difference ΔE between reflected light in the pattern area and reflected light in the area just below the pattern opening, by using the following formula:

$$\Delta E = \{(\Delta L^*)^2 + (\Delta a^*)^2 + (\Delta b^*)^2\}^{0.5}$$

EXAMPLES

Inventive Example 1

Formation of Undercoat Layer

A thermosetting resin composition containing a melamine resin, an alkyd resin and an organic silane condensate at a weight ratio of 2:2:1 was applied to one surface of a transparent film substrate (refractive index $n_1$=1.65) composed of a 25 μm-thick polyethylene terephthalate film (hereinafter referred to as "PET film"), and then dried and hardened to form a first undercoat layer composed of a 20 nm-thick dielectric layer. In Inventive Example 1, the first undercoat layer had a refractive index $n_{21}$ of 1.54.

Then, a second dielectric layer composed of a 10 nm-thick dielectric layer was formed by: diluting silica sol (Colcoat P produced by Colcoat Co., Ltd.) with ethanol to allow a concentration of solid content to become 2 weight %; applying the diluted silica sol to the first undercoat layer by a silica coating method; and drying and hardening the silica sol. The second dielectric layer had a refractive index $n_{22}$ of 1.46.

(Formation of ITO Film)

A 23 nm-thick ITO film (refractive index $n_3$=2.00) was formed on the second undercoat layer by a reactive sputtering method using a sintered body comprising 97 weight % of indium oxide and 3 weight % of tin oxide, in an atmosphere containing 98% of argon gas and 2% of oxygen gas and having a pressure of 0.4 Pa, to obtain a touch sensor laminate.

(Patterning of ITO Film)

A photoresist patterned in stripes was applied to the transparent conductive layer of the transparent conductive film, and then dried and hardened. Then, the ITO film was etched by immersing it in a 5 weight % hydrochloric acid solution (aqueous hydrogen chloride solution) at 25° C. for 1 minute. After completion of the etching, the photoresist was removed.

(Crystallization of ITO Film)

The etched ITO film was crystallized through a heating treatment at 140° C. for 90 minutes.

Inventive Example 2

A first undercoat layer composed of a dielectric layer, a second undercoat layer composed of a dielectric layer, and an ITO film were formed on one surface of a PET film to obtain a touch sensor laminate, in the same manner as that in Inventive Example 1.

(Patterning of ITO Film)

A photoresist patterned in stripes was applied to the transparent conductive layer of the touch sensor laminate, and then dried and hardened. Then, the ITO film was etched by immersing it in a 5 weight % hydrochloric acid solution at 25° C. for 1 minute.

(Patterning of Second Undercoat Layer)

After etching the ITO film, the second undercoat layer composed of a dielectric film was subsequently etched by immersing it in a 2 weight % sodium hydroxide aqueous solution at 45° C. for 3 minutes, while leaving the laminated photoresist. After completion of the etching, the photoresist was removed.

(Crystallization of ITO Film)

After patterning the ITO film and the second undercoat layer, the ITO film was crystallized through a heating treatment at 140° C. for 90 minutes.

Inventive Examples 3 and 4

In Inventive Examples 3 and 4, two types of touch sensor laminates each having a pattern area and a pattern opening were prepared in the same manner as those in Inventive Examples 1 and 2. However, Inventive Examples 3 and 4 were different from Inventive Examples 1 and 2, in that the thickness of the first undercoat layer composed of a dielectric layer was set to 35 nm, and the thickness of the second undercoat layer composed of a dielectric layer was set to 5 nm.

Inventive Examples 5 and 6

In Inventive Examples 5 and 6, two types of touch sensor laminates each having patterned areas and patterning openings were prepared in the same manner as those in Inventive Examples 1 and 2. However, Inventive Examples 5 and 6 were different from Inventive Examples 1 and 2, in that the thickness of the first undercoat layer composed of a dielectric layer was set to 30 nm, and the thickness of the second undercoat layer composed of a dielectric layer was set to 15 nm.

Comparative Example 1

In Comparative Example 1, a touch sensor laminate having a pattern area and a pattern opening was prepared in the same manner as that in Inventive Example 1. However, Comparative Example 1 was different from Inventive Example 1, in that the thickness of the first undercoat layer composed of a dielectric layer was set to 45 nm, and the thickness of the second undercoat layer composed of a dielectric layer was set to 10 nm.

Comparative Example 2

In Comparative Example 2, a touch sensor laminate having a pattern area and a pattern opening was prepared in the same manner as that in Inventive Example 1. However, Comparative Example 2 was different from Inventive Example 1, in that the thickness of the first undercoat layer composed of a dielectric layer was set to 30 nm, and the thickness of the second undercoat layer composed of a dielectric layer was set to 30 nm.

Comparative Example 3

In Comparative Example 3, a touch sensor laminate having a pattern area and a pattern opening was prepared in the same manner as that in Inventive Example 1. However, Comparative Example 3 was different from Inventive Example 1, in that the thickness of the first undercoat layer composed of a dielectric layer was set to 40 nm, and the thickness of the second undercoat layer composed of a dielectric layer was set to 30 nm.

Comparative Example 4

In Comparative Example 4, a touch sensor laminate having a pattern area and a pattern opening was prepared in the same manner as that in Inventive Example 1. However, Comparative Example 4 was different from Inventive Example 1, in that the first undercoat layer composed of a dielectric layer was formed in the following manner, and the thickness of the second undercoat layer composed of a dielectric layer was set to 35 nm.

(Formation of First Undercoat Layer)

A 20 nm-thick silicon tin oxide film was formed, as the first undercoat layer composed of a dielectric layer, on one surface of a 25 μm-thick PET film substrate (refractive index $n_1$=1.65) by a sputtering method. The first undercoat layer composed of a dielectric layer had a refractive index of 1.70.

Evaluation results of the touch sensor laminates of the Inventive Examples and Comparative Examples are illustrated in the following Table 1.

patterned in the same manner as that for the transparent conductive layer or ITO film as mentioned in Inventive Examples 2, 4, and 6, the pattern is far less likely to become visible and therefore good appearance can be ensured.

Inventive Example 7

Formation of Hard Coat Layer

As a substrate, a transparent film substrate (refractive index $n_1$=1.65) composed of a 25 μm-thick polyethylene terephthalate film (hereinafter referred to as "PET film") was used. Further, 5 weight parts of photopolymerization initiator ("IRGACURE 907" produced by Ciba Specialty Chemicals Inc.) was added to an ultraviolet curable resin comprising isocyanurate-based acrylate, pentaerythritol triacrylate, and isophorone diisocyanate polyurethane ("UNIDIC 17-806" produced by DIC Corporation), with respect to 100 weight parts of a solid content of the resin, and a resulting mixture was diluted by a mixed solvent containing butyl acetate and ethyl acetate at a ratio of 2/3, to allow a concentration of solid content to become 50%, to obtain a hard coat layer forming material.

The above hard coat layer forming material was applied to opposite surfaces of the PET film substrate by a die coater, and dried at 100° C. for 3 minutes. Then, the hard coat layer forming material was subjected to a hardening treatment by irradiation with ultraviolet light in an integral light amount of 200 mj/cm$^2$, using a high-pressure mercury lamp, to form a 2 μm-thick hard coat layer (refractive index $n_2$=1.52).

(Formation of Undercoat Layer)

A thermosetting resin composition containing a melamine resin, an alkyd resin and an organic silane condensate at a weight ratio of 2:2:1 was applied to the respective opposite surfaces of the transparent film substrate each formed with the hard coat layer, and then dried and hardened to form a first undercoat layer composed of a 20 nm-thick dielectric layer. In Inventive Example 7, the first undercoat layer had a refractive index $n_{31}$ of 1.54.

Then, a second dielectric layer composed of a 10 nm-thick dielectric layer was formed by: diluting silica sol (Colcoat P produced by Colcoat Co., Ltd.) with ethanol to allow a concentration of solid content to become 2 weight %; applying the diluted silica sol to the first undercoat layer on each of the

TABLE 1

|  | First Undercoat Layer | | Second Undercoat Layer | | | Reflective Properties | |
| --- | --- | --- | --- | --- | --- | --- | --- |
|  | $n_{21}$ | $d_{21}$ (nm) | $n_{22}$ | $d_{22}$ (nm) | Patterning | ΔE | ΔR (%) |
| Inventive Example 1 | 1.54 | 20 | 1.46 | 10 | NO | 3.2 | 0.26 |
| Inventive Example 2 | 1.54 | 20 | 1.46 | 10 | YES | 2.4 | 0.19 |
| Inventive Example 3 | 1.54 | 35 | 1.46 | 5 | NO | 5.4 | 0.65 |
| Inventive Example 4 | 1.54 | 35 | 1.46 | 5 | YES | 5.2 | 0.46 |
| Inventive Example 5 | 1.54 | 30 | 1.46 | 15 | NO | 6.5 | 0.56 |
| Inventive Example 6 | 1.54 | 30 | 1.46 | 15 | YES | 5.4 | 0.47 |
| Comparative Example 1 | 1.54 | 45 | 1.46 | 10 | NO | 8.9 | 1.23 |
| Comparative Example 2 | 1.54 | 30 | 1.46 | 30 | NO | 11.3 | 1.19 |
| Comparative Example 3 | 1.54 | 40 | 1.46 | 30 | NO | 12.7 | 1.94 |
| Comparative Example 4 | 1.70 | 20 | 1.46 | 35 | NO | 6.8 | 1.08 |

Table 1 shows that the reflectance difference and the color difference between the pattern area and the pattern opening in the touch sensor laminate of the present invention are small even when the transparent conductive layer or ITO film is patterned, and therefore the pattern is less likely to become visible. In particular, when the second undercoat layer is opposite surfaces of the transparent film substrate by a silica coating method; and drying and hardening the silica sol. The second dielectric layer had a refractive index $n_{32}$ of 1.46.

(Formation of ITO Film)

A 23 nm-thick ITO film (refractive index $n_4$=2.00) was formed on the second undercoat layer by a reactive sputtering method using a sintered body comprising 97 weight % of indium oxide and 3 weight % of tin oxide, in an atmosphere containing 98% of argon gas and 2% of oxygen gas and having a pressure of 0.4 Pa, to obtain a touch sensor laminate.

(Patterning of ITO Film)

A protective later composed of a polyester film was laminated to one of the transparent conductive layers or ITO films of the touch sensor laminate. On the other hand, a photoresist patterned in stripes was applied to the other transparent conductive layer or ITO film, and then dried and hardened. Then, the ITO film was etched by immersing it in a 5 weight % hydrochloric acid solution (aqueous hydrogen chloride solution) at 25° C. for 1 minute. After completion of the etching, the photoresist was removed. In this way, a first transparent electrode pattern was formed. Subsequently, after protecting the first transparent electrode pattern by a protective layer, a second transparent electrode pattern was formed in the same operation as described above.

(Crystallization of ITO Film)

The etched ITO film was crystallized through a heating treatment at 140° C. for 90 minutes.

Comparative Example 5

A touch sensor laminate was obtained in the same operation as that in Inventive Example 7, except that neither a hard coat layer nor an undercoat layer is formed on one of the opposite surfaces of the PET film substrate.

Comparative Example 6

A touch sensor laminate was obtained in the same operation as that in Inventive Example 7, except that no undercoat layer is formed on one of the opposite surfaces of the PET film substrate.

(Evaluation on Warp of Film)

The touch sensor laminate was cut into a film with a size of 10 cm×10 cm, and a warp of the film was evaluated.

○: Warping deformation is small (an average of warping deformations at 4 corners is less than 5 mm)

x: Warping deformation is large (the average of warping deformations at 4 corners is equal to or greater than 5 mm)

(Evaluation on Appearance)

A visual evaluation was performed under a condition that the first transparent electrode pattern faces the viewing side.

○: Pattern visibility in each surface is even (ΔR is less than 1%)

x: Pattern visibility in each surface is uneven (ΔR is equal to or greater than 1%)

The evaluation results are illustrated in the following Table 2.

TABLE 2

| Transparent conductive layer | Inventive Example 7 | Comparative Example 5 | Comparative Example 6 |
|---|---|---|---|
| | First transparent electrode pattern | | |
| Undercoat layer | With | With | With |
| Hard coat | With | With | With |
| Substrate | | PET | |
| Hard coat | With | W/O | With |
| Undercoat layer | With | W/O | W/O |
| | Second transparent electrode pattern | | |
| Warp of film | ○ | x | ○ |
| Visibility of ITO pattern | ○ | x | x |

The above results can verify an anti-warp effect of the present invention.

As above, although the present invention has been particularly shown and described with reference to specific embodiments thereof, it is to be understood that the scope of the present invention is not limited to details of the illustrated embodiments, but should be determined by the appended claims and their legal equivalents.

EXPLANATION OF CODES

1: display panel device
3: touch sensor laminate
5: display panel
7: window
11: adhesive layer
13: edge print
115: circular polarization functional laminate
115a: polarizing film layer
115b: λ/4 retardation film
31: first transparent electrically conductive layer
32: second transparent electrically conductive layer
33, 36: conductive layer-side undercoat layer
34, 37: substrate layer-side undercoat layer
35: first transparent substrate layer
38: second transparent substrate layer
39: adhesive layer
51, 52: polarizer film

What is claimed is:

1. A capacitive touch sensor laminate for use in a display panel device having a touch input function, comprising:
a dielectric central substrate structure made of a transparent resin material and formed to have flat surfaces, respectively, on opposite sides thereof;
an at least one-layer structured coat layer made of a transparent material and formed on each of the flat surfaces; and
a transparent electrically conductive layer formed on and in adjacent relation to the coat layer;
wherein;
each of the at least one-layer structured coat layers comprises at least one refractive index adjusting layer for suppressing visibility of an electrode pattern formed by the transparent electrically conductive layer,
each of the at least one-layer structured coat layers formed on respective ones of the flat surfaces are configured such that thicknesses of corresponding layers therein on respective opposite sides of the dielectric central substrate structure are set to allow the corresponding layers to become mutually symmetrical across the dielectric central substrate structure,
each of the refractive index adjusting layers comprises a first refractive index adjusting undercoat layer, and a second refractive index adjusting undercoat layer formed on the first refractive index adjusting undercoat layer, wherein the first refractive index adjusting undercoat layer is between the dielectric central substrate structure and the second refractive index adjusting undercoat layer,
the first refractive index adjusting undercoat layer has a refractive index greater than that of the second refractive index adjusting undercoat layer, and
the first refractive index adjusting undercoat layer has a thickness which is 35 nanometers (nm) or less, and the second refractive index adjusting undercoat layer has a thickness less than that of the first undercoat layer.

2. The capacitive touch sensor laminate as defined in claim 1, wherein each of the at least one-layer structured coat layers further comprises: a hard coat layer, and the hard coat layer is between the at least one refractive index adjusting layer and the dielectric central substrate structure.

3. The capacitive touch sensor laminate as defined in claim 2, wherein the first refractive index adjusting undercoat layer is between the hard coat layer and the second refractive index adjusting undercoat layer.

4. The capacitive touch sensor laminate as defined in claim 1, wherein the thickness of each of the second undercoat layers is equal to or less than ½ of the thickness of each of the first undercoat layers.

5. The capacitive touch sensor laminate as defined in claim 1, wherein the dielectric central substrate structure is prepared by bonding first and second transparent substrate layers made of a same material and formed to have a same thickness, together through a transparent adhesive material layer.

6. The capacitive touch sensor laminate as defined in claim 5, wherein each of the first and second transparent substrate layers is bonded to the transparent adhesive material layer through a second hard coat layer.

7. The capacitive touch sensor laminate as defined in claim 1, wherein the dielectric central substrate structure is composed of a single transparent resin material layer.

8. The capacitive touch sensor laminate as defined in claim 7, wherein the single transparent resin material layer is made of an optically isotropic material.

9. The capacitive touch sensor laminate as defined in claim 7, wherein the single transparent resin material layer is formed as a ¼ wavelength retardation layer.

10. The capacitive touch sensor laminate as defined in claim 1, wherein a pattern of the transparent electrically conductive layer on a first side of the dielectric central substrate is offset with respect to a pattern of the transparent electrically conductive layer on a second side of the dielectric central substrate.

* * * * *